United States Patent
Yim et al.

(10) Patent No.: US 11,514,523 B2
(45) Date of Patent: Nov. 29, 2022

(54) AI-BASED REAL-TIME PREDICTION ENGINE APPARATUSES, METHODS AND SYSTEMS

(71) Applicant: FMR LLC, Boston, MA (US)

(72) Inventors: Man Hei Raymond Yim, Cambridge, MA (US); Johnny Chang, Winchester, MA (US)

(73) Assignee: FMR LLC, Boston, MA (US)

( * ) Notice: Subject to any disclaimer, the term of this patent is extended or adjusted under 35 U.S.C. 154(b) by 40 days.

(21) Appl. No.: 16/686,446

(22) Filed: Nov. 18, 2019

(65) Prior Publication Data

US 2021/0125277 A1  Apr. 29, 2021

Related U.S. Application Data

(60) Provisional application No. 62/927,085, filed on Oct. 28, 2019.

(51) Int. Cl.
*G06Q 40/04* (2012.01)
*G06N 20/00* (2019.01)
*G06Q 30/06* (2012.01)

(52) U.S. Cl.
CPC .............. *G06Q 40/04* (2013.01); *G06N 20/00* (2019.01); *G06Q 30/0633* (2013.01)

(58) Field of Classification Search
CPC .................................................... G06Q 40/04
See application file for complete search history.

(56) References Cited

U.S. PATENT DOCUMENTS

| 10,949,860 B2* | 3/2021 | Zhang |
| 2010/0070417 A1* | 3/2010 | Flynn |
| 2015/0012410 A1* | 1/2015 | Eastwood .............. G06Q 40/06 |

(Continued)

FOREIGN PATENT DOCUMENTS

WO    WO 2021016148    * 11/2019

OTHER PUBLICATIONS

Xie, M., in "Development of Artificial Intelligence and Effects on Financial System," 2019 (Year: 2019).*

*Primary Examiner* — Mike Anderson
*Assistant Examiner* — Brandon M Duck
(74) *Attorney, Agent, or Firm* — Hanchuk Kheit LLP; Walter G. Hanchuk

(57) ABSTRACT

The AI-Based Real-Time Prediction Engine Apparatuses, Methods and Systems ("AIRTPE") transforms machine learning training input, order placement input inputs via AIRTPE components into machine learning training output, order placement output, information leakage alert outputs. An order placement datastructure associated with a security identifier is obtained. An order placement allocation for the security identifier is determined. An order placement request datastructure for a first order is sent to a server associated with a first venue. A set of trade tick data messages associated with the first venue is obtained. A set of inferred labels is determined for each obtained trade tick data message using a real-time prediction logic generated using a machine learning technique. The inferred labels of a selected inferred label type are grouped into buckets. When it is determined that the grouped inferred labels correspond to execution data generated by the first order, an information leakage alert is generated.

22 Claims, 15 Drawing Sheets

(56) References Cited

U.S. PATENT DOCUMENTS

| | | | |
|---|---|---|---|
| 2019/0114334 A1* | 4/2019 | Gunther | |
| 2019/0354815 A1* | 11/2019 | Yun | G06K 9/6277 |
| 2020/0160200 A1* | 5/2020 | Newman | |
| 2020/0394709 A1* | 12/2020 | Celia | |
| 2021/0087921 A1* | 3/2021 | Prochnow | E21B 47/003 |
| 2021/0176262 A1* | 6/2021 | Harris | |
| 2021/0201328 A1* | 7/2021 | Gunther | G06Q 30/018 |
| 2021/0335501 A1* | 10/2021 | Rajagopal | |
| 2021/0342836 A1* | 11/2021 | Celia | |

* cited by examiner

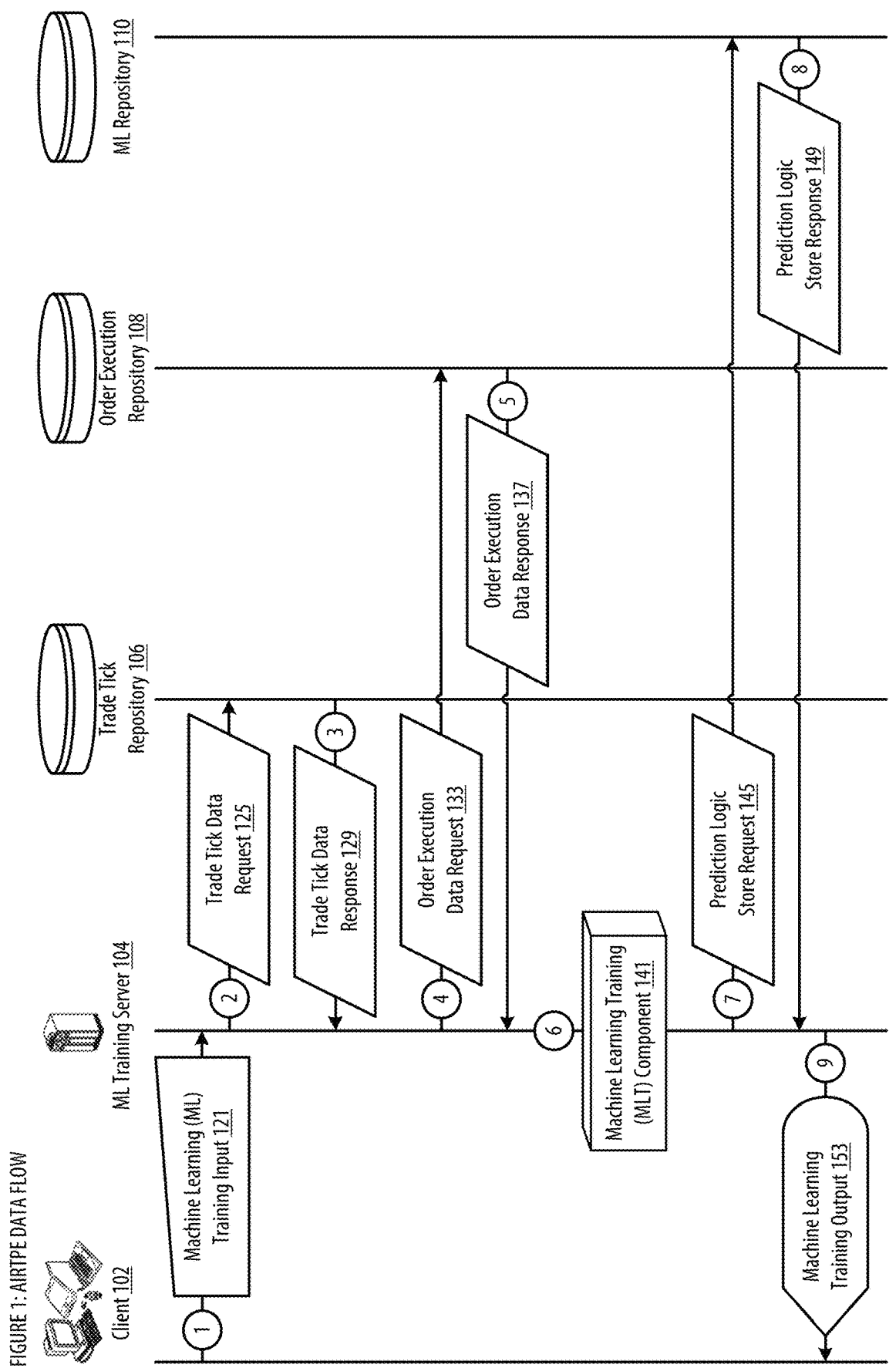
FIGURE 1: AIRTPE DATA FLOW

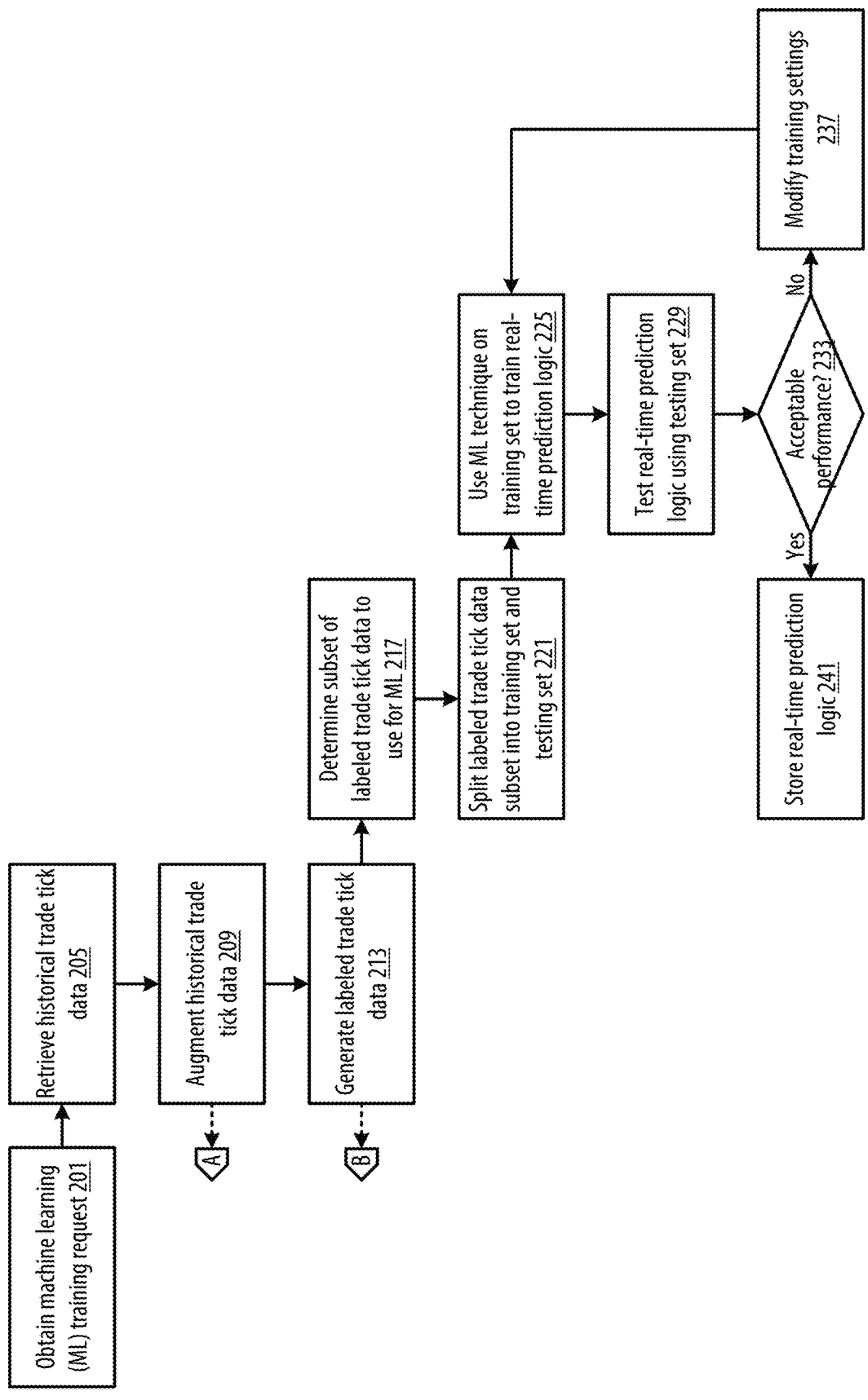

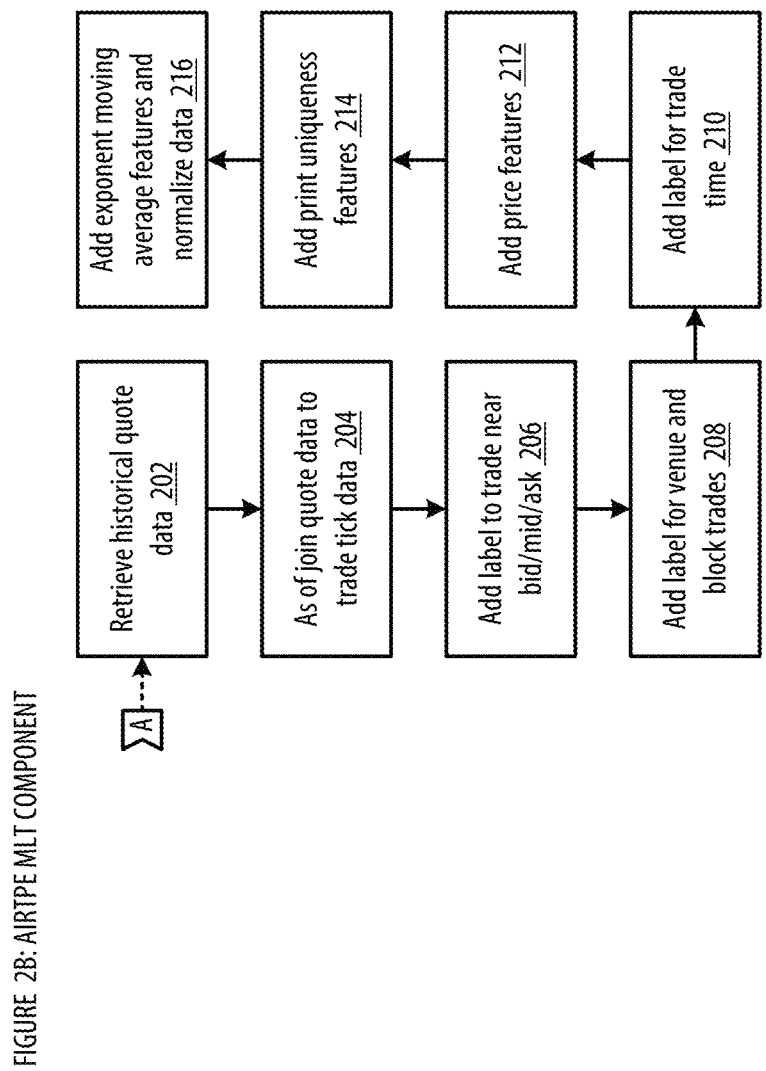
FIGURE 2B: AIRTPE MLT COMPONENT

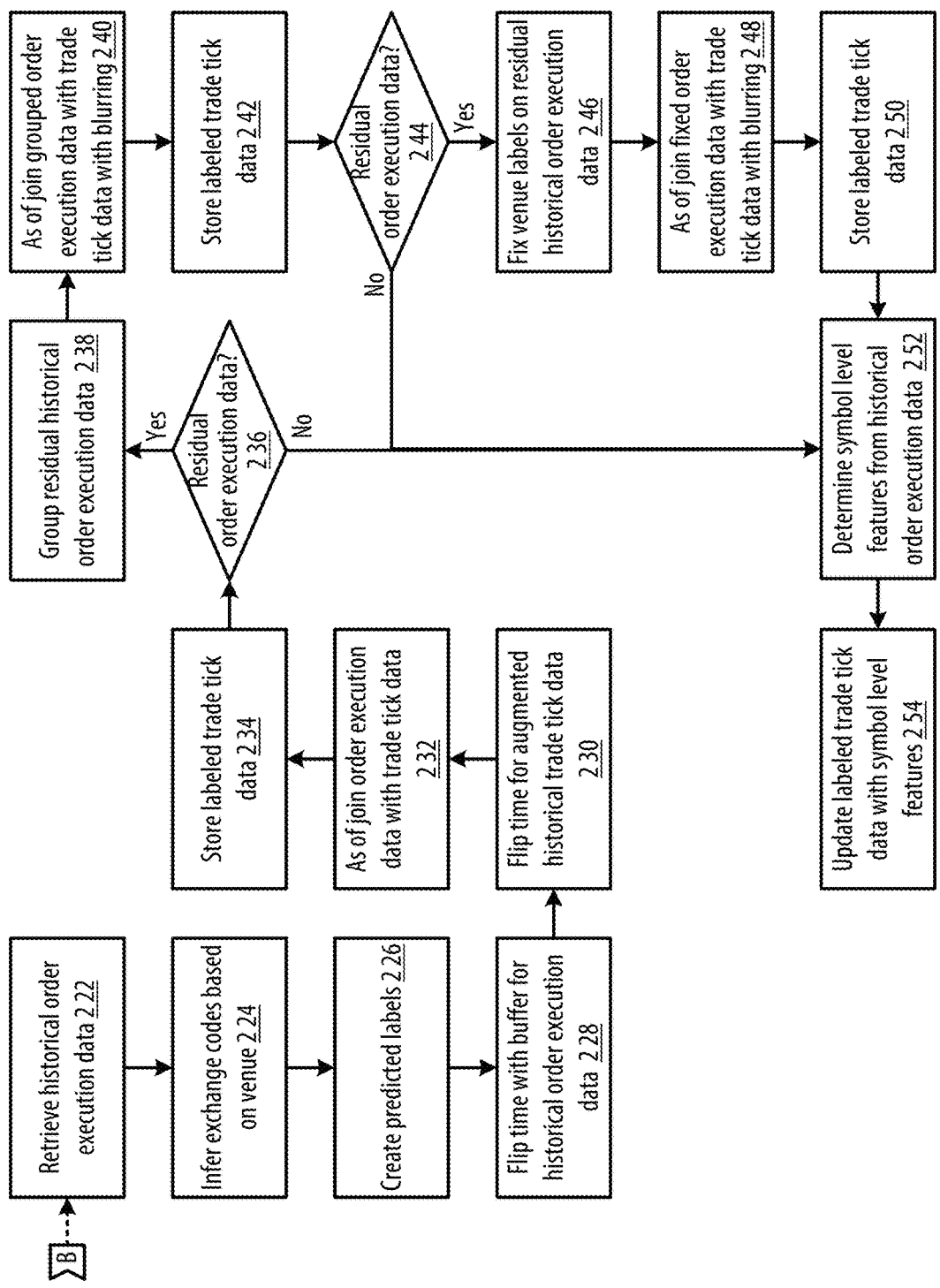
FIGURE 2 C: AIRTPE MLT COMPONENT

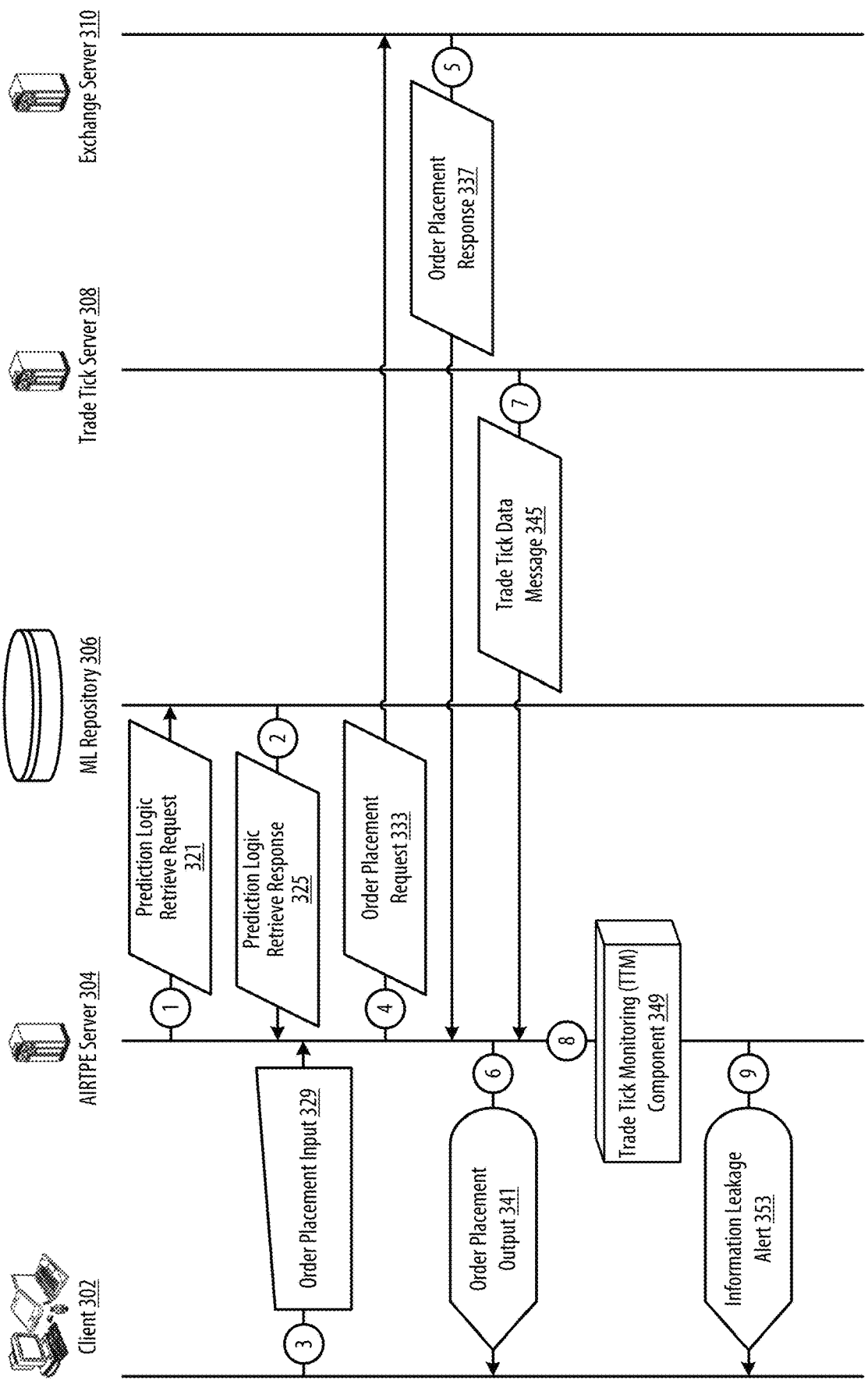

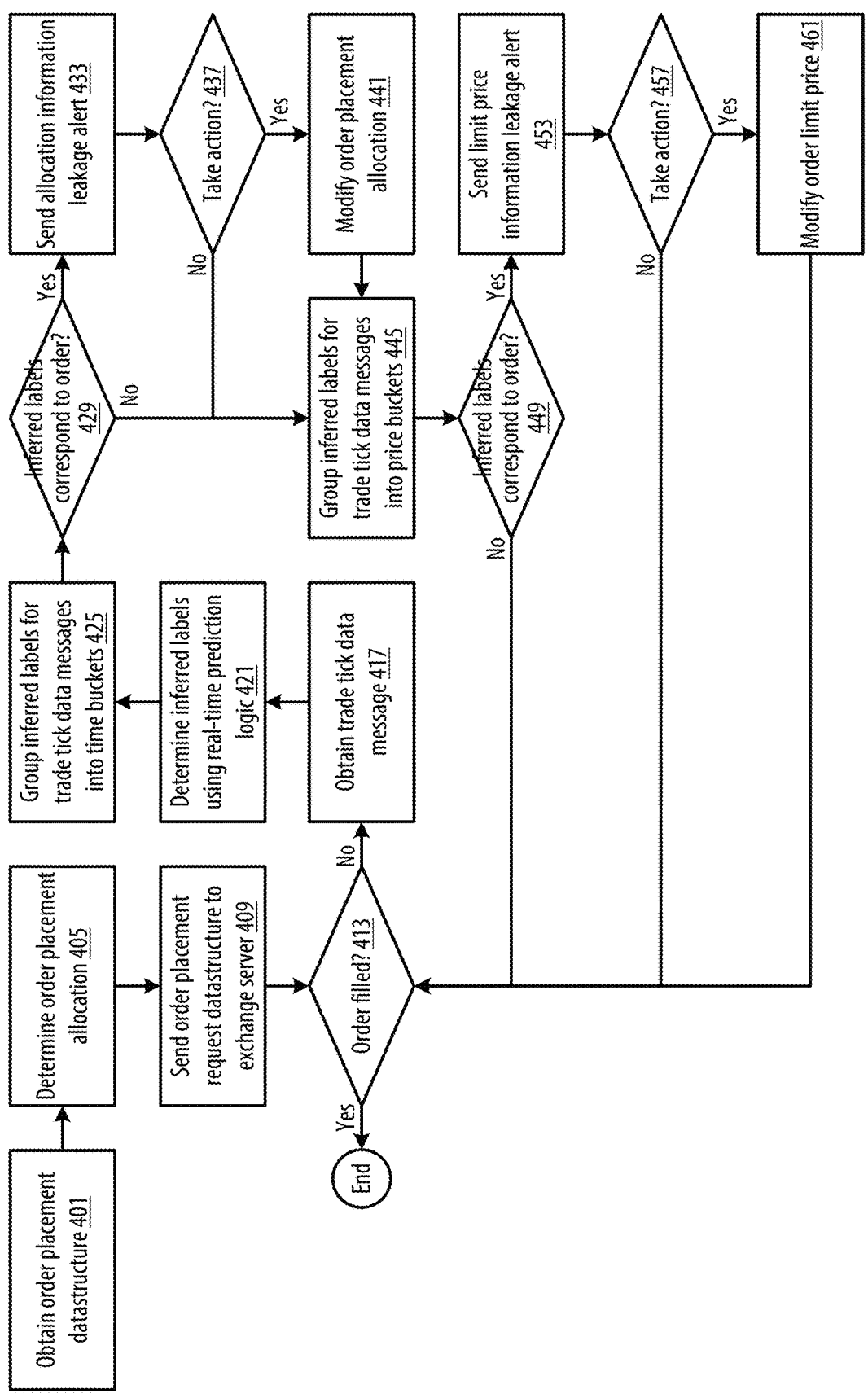

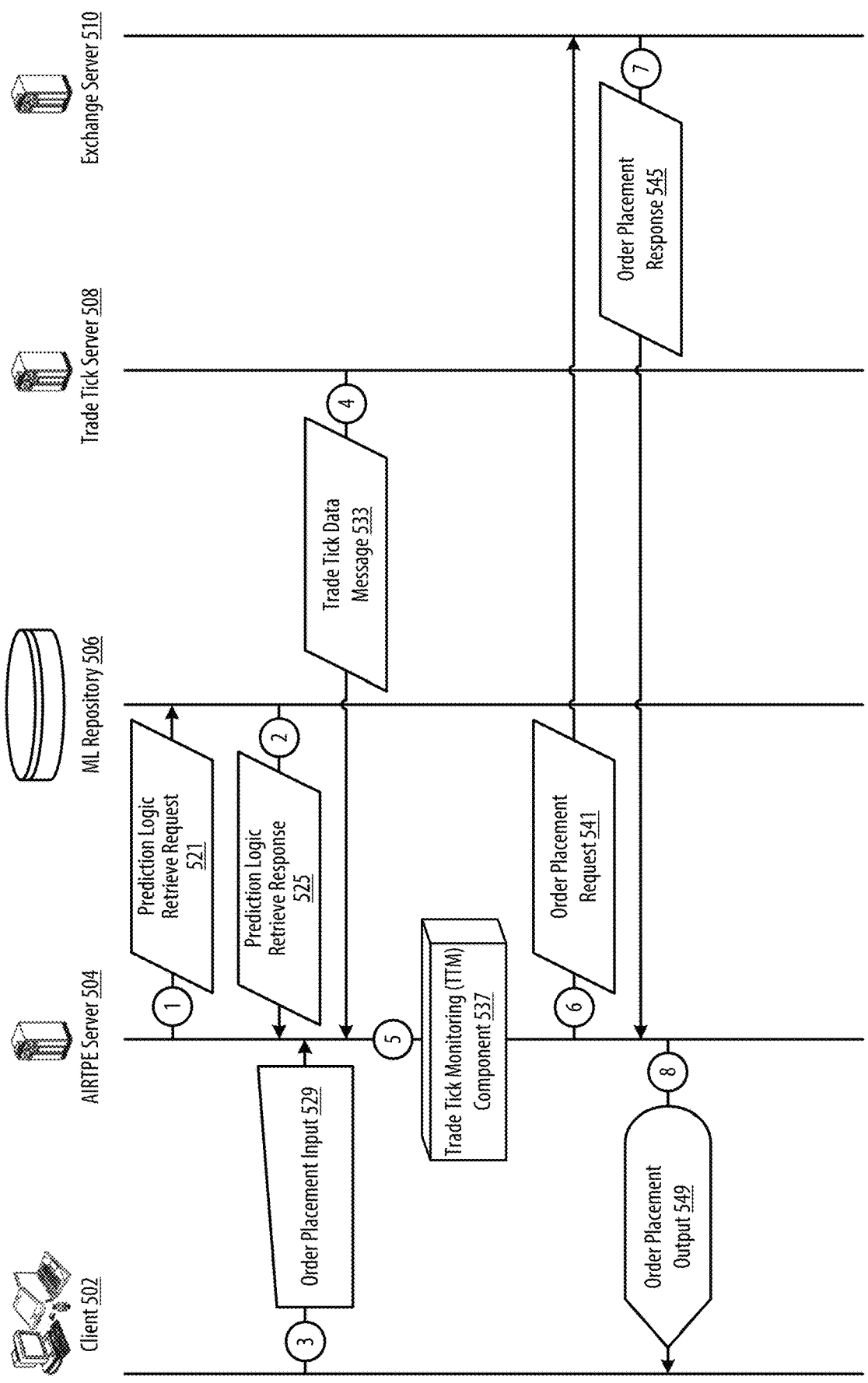

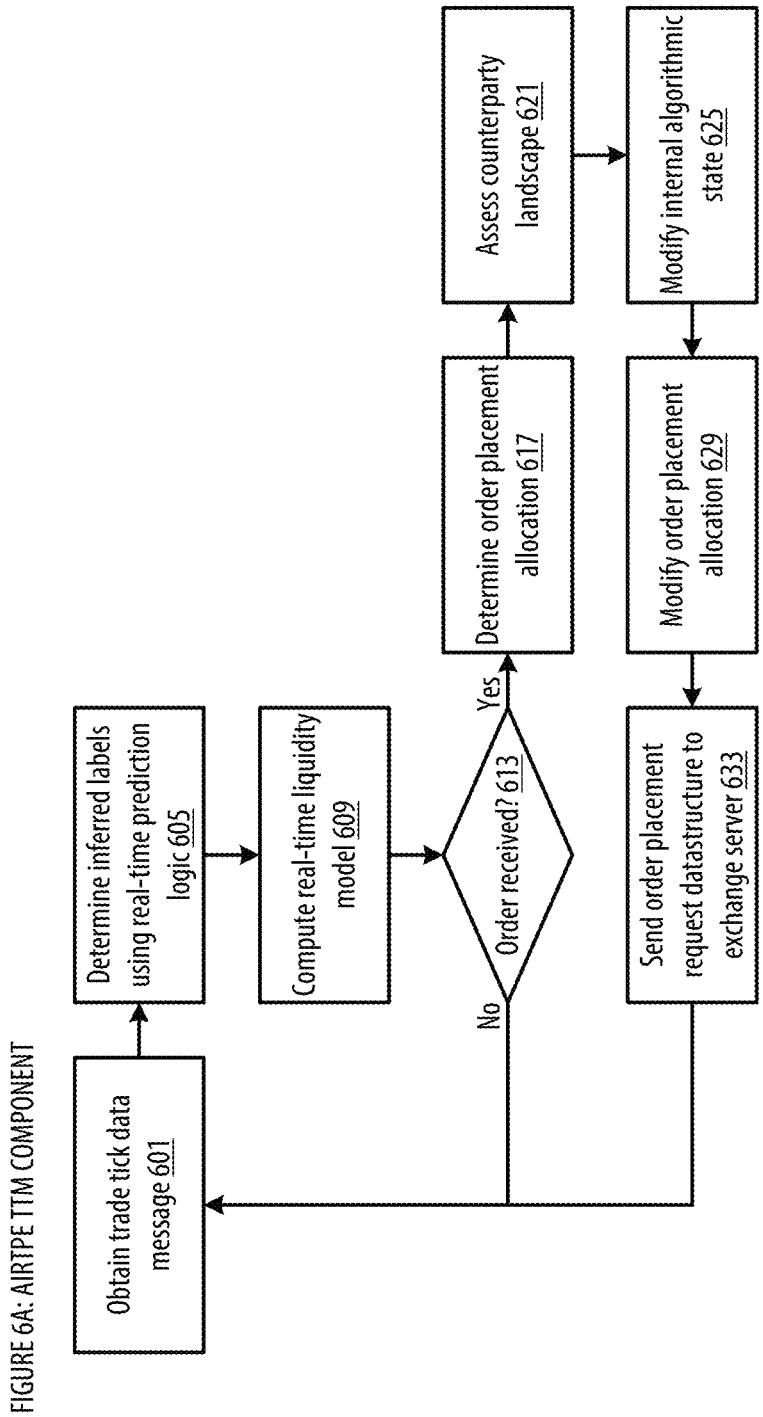
FIGURE 6A: AIRTPE TTM COMPONENT

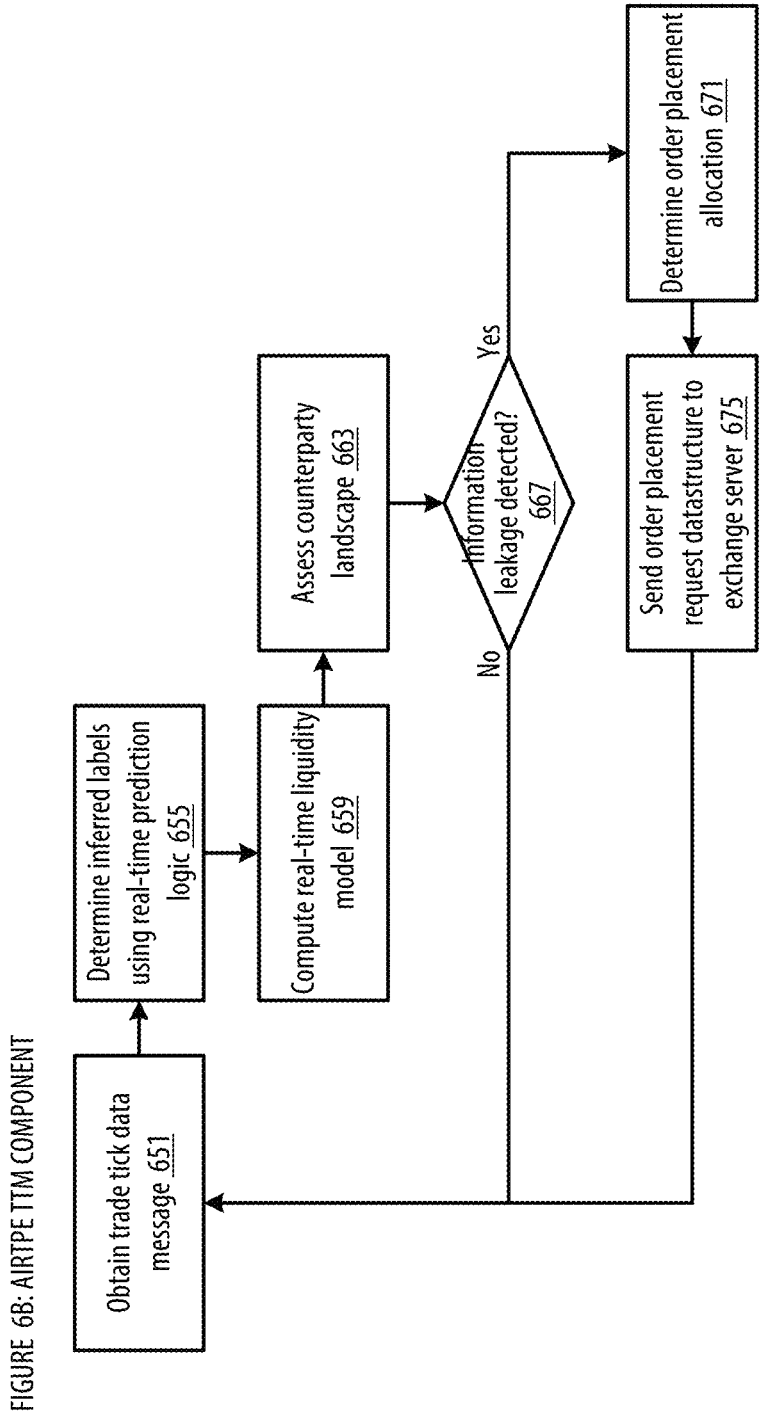
FIGURE 6B: AIRTPE TTM COMPONENT

FIGURE 7: AIRTPE IMPLEMENTATION CASE

Who is using what at what urgency?

3% market prints goes through our complex. Develop intelligence for the rest to add colors to every trade tick in the market. Measure ourselves against a strong baseline.

| Sym | Time | Price | Size | Exch | Infer this → | |
|---|---|---|---|---|---|---|
| FANG | 13:02:28.986 | 115.54 | 100 | Dark | Tier 1 Dark Neutral | |
| TRXC | 12:37:02.227 | 3.7366 | 199 | Dark | Retail SOR | |
| EXG | 12:28:14.762 | 9.3507 | 100 | Dark | Inst SOR | |
| SPY | 09:55:57.772 | 272.98 | 2000 | NSDQ | MM Exhaust | |
| CVS | 10:23:36.467 | 64.06 | 100 | EDGX | Inst VWAP Passive | |

Who is behind the prints?

Baseline: decision tree based on a print's exchange, trade qualifier, and underlying market cap.

Proposed: random forest using 1000 decision trees, and more than 50 factors.

| Prediction | Baseline | Proposed | Lift | Recall | Precision |
|---|---|---|---|---|---|
| Institutional | 39% | 43% | 4% | 34% | 60% |
| Retail/RIA | 28% | 42% | 14% | 51% | 39% |
| Direct Inst | 22% | 63% | 41% | 79% | 53% |

(Improvement; Coverage)

Where are the prints coming from?

Baseline: decision tree based on a print's exchange, trade qualifier, and volume.

| Prediction | Baseline | Proposed | Lift | Recall | Precision |
|---|---|---|---|---|---|
| Tier 1 Dark | 57% | 67% | 10% | 86% | 55% |
| Tier 2 Dark | 16% | 55% | 39% | 41% | 83% |
| Lit | 69% | 77% | 8% | 73% | 81% |
| Exhaust from Market Maker | 3% | 8% | 5% | 61% | 5% |

Really good at identifying lower tier interactions in market (e.g., one of contra is an HFT / Market Maker)

What algos are in-play?

Baseline: decision tree based on a print's exchange and underlying security attributes.

| Prediction | Baseline | Proposed | Lift | Recall | Precision |
|---|---|---|---|---|---|
| Dark | 31% | 39% | 8% | 41% | 37% |
| IS | 5% | 12% | 7% | 8% | 24% |
| LSA | 5% | 3% | -2% | 2% | 21% |
| POV | 5% | 0% | -5% | 0% | 30% |
| SOR | 8% | 38% | 30% | 34% | 43% |
| VWAP | 22% | 27% | 5% | 28% | 27% |

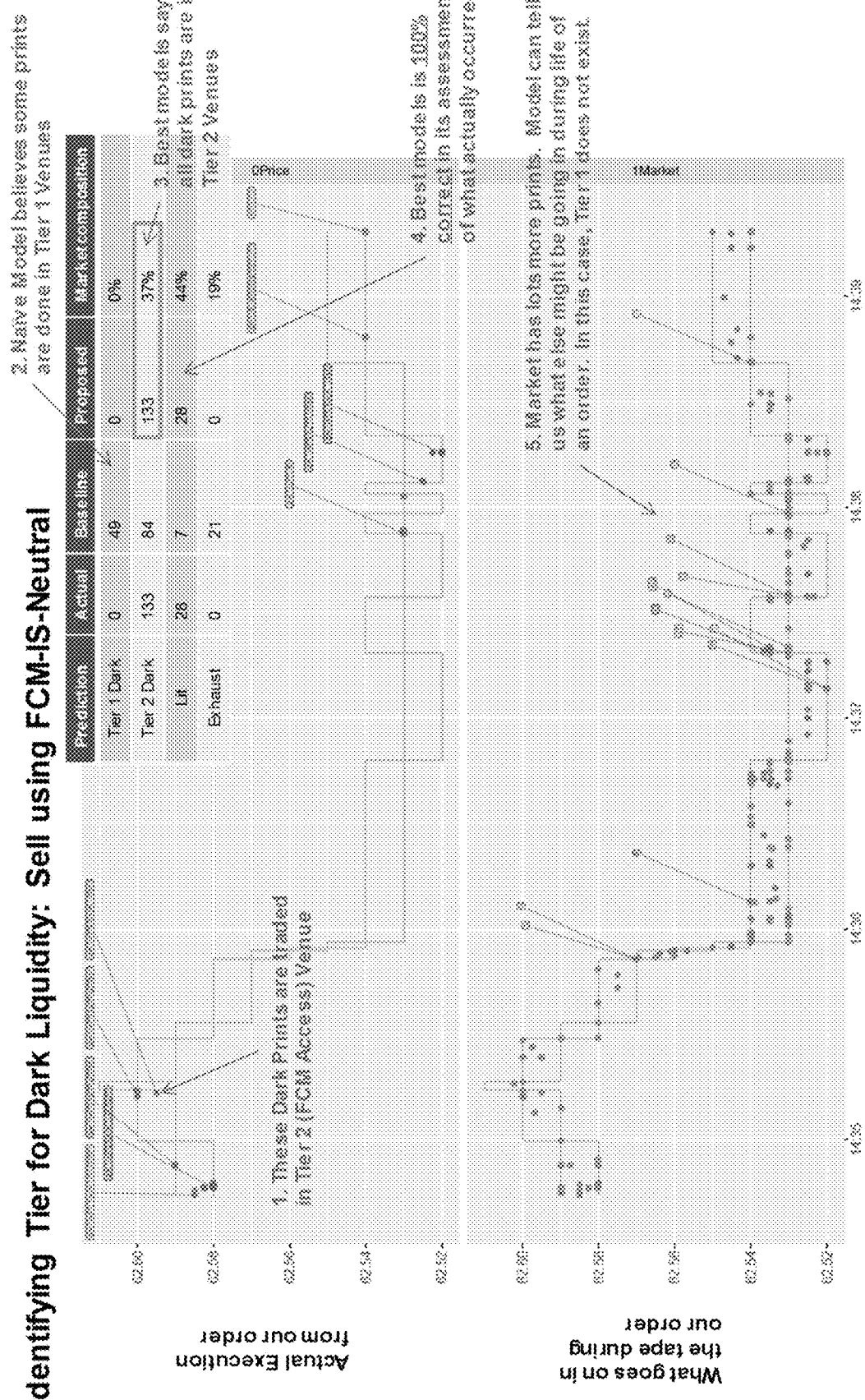
FIGURE 8: AIRTPE IMPLEMENTATION CASE

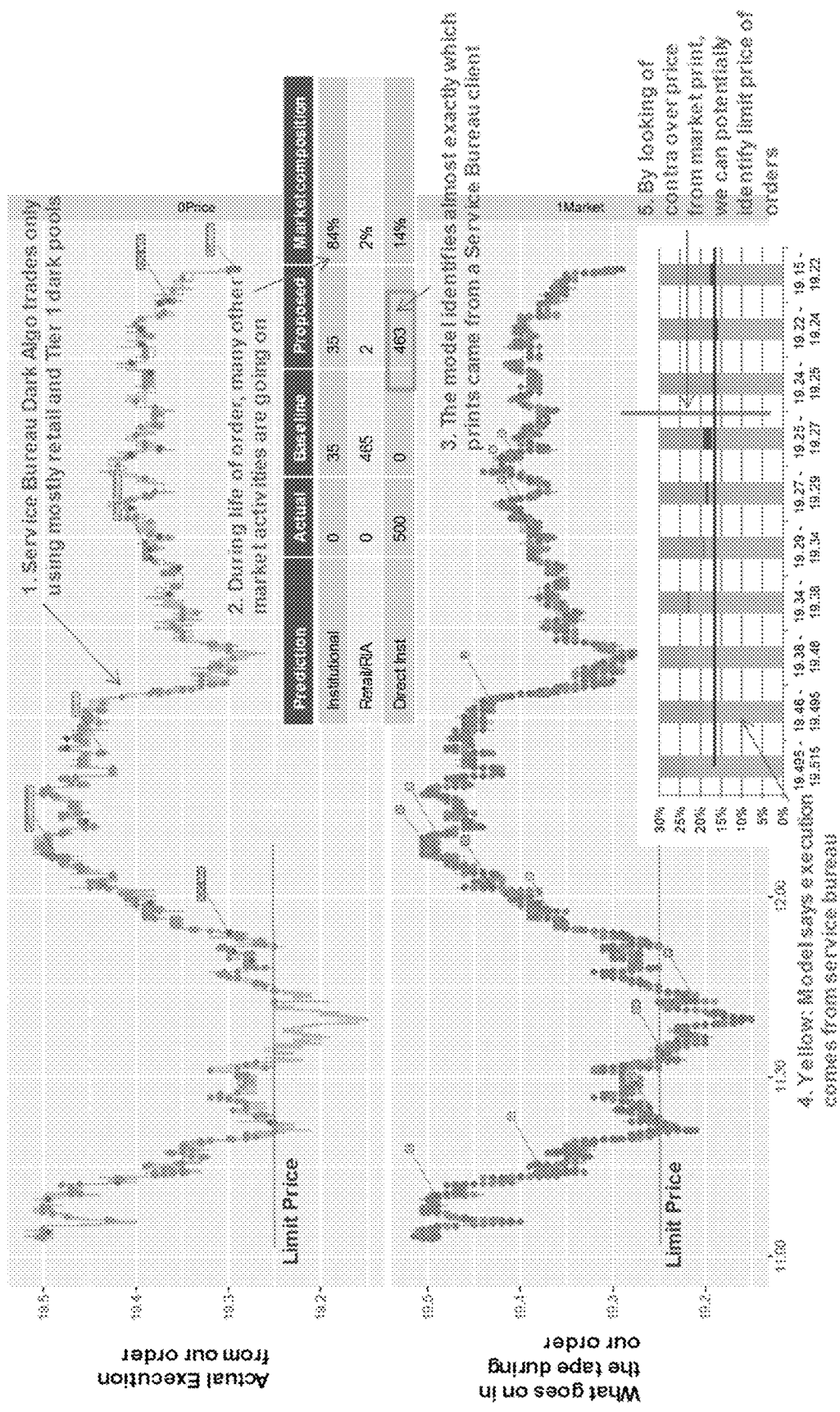
FIGURE 9: AIRTPE IMPLEMENTATION CASE

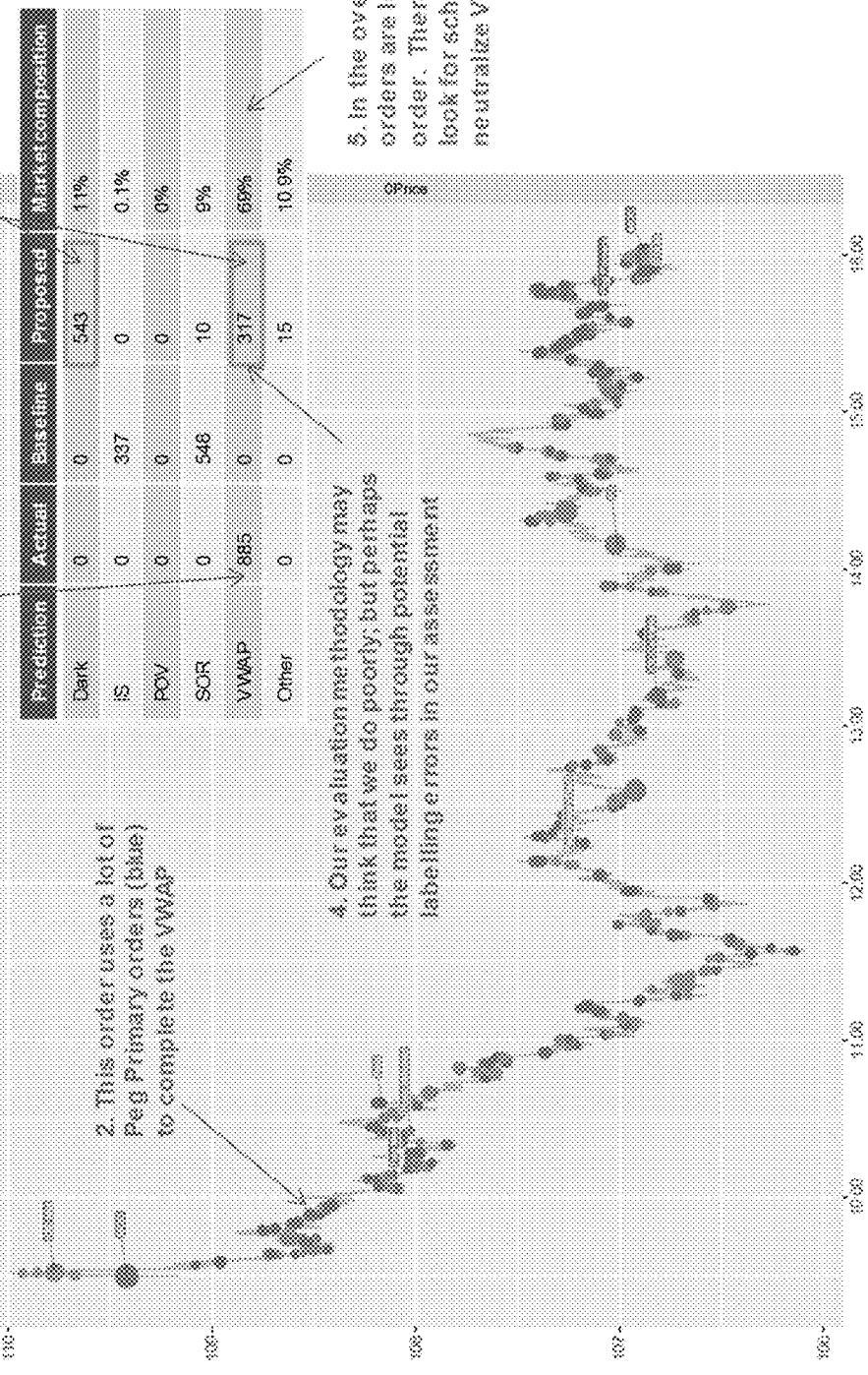
FIGURE 10: AIRTPE IMPLEMENTATION CASE

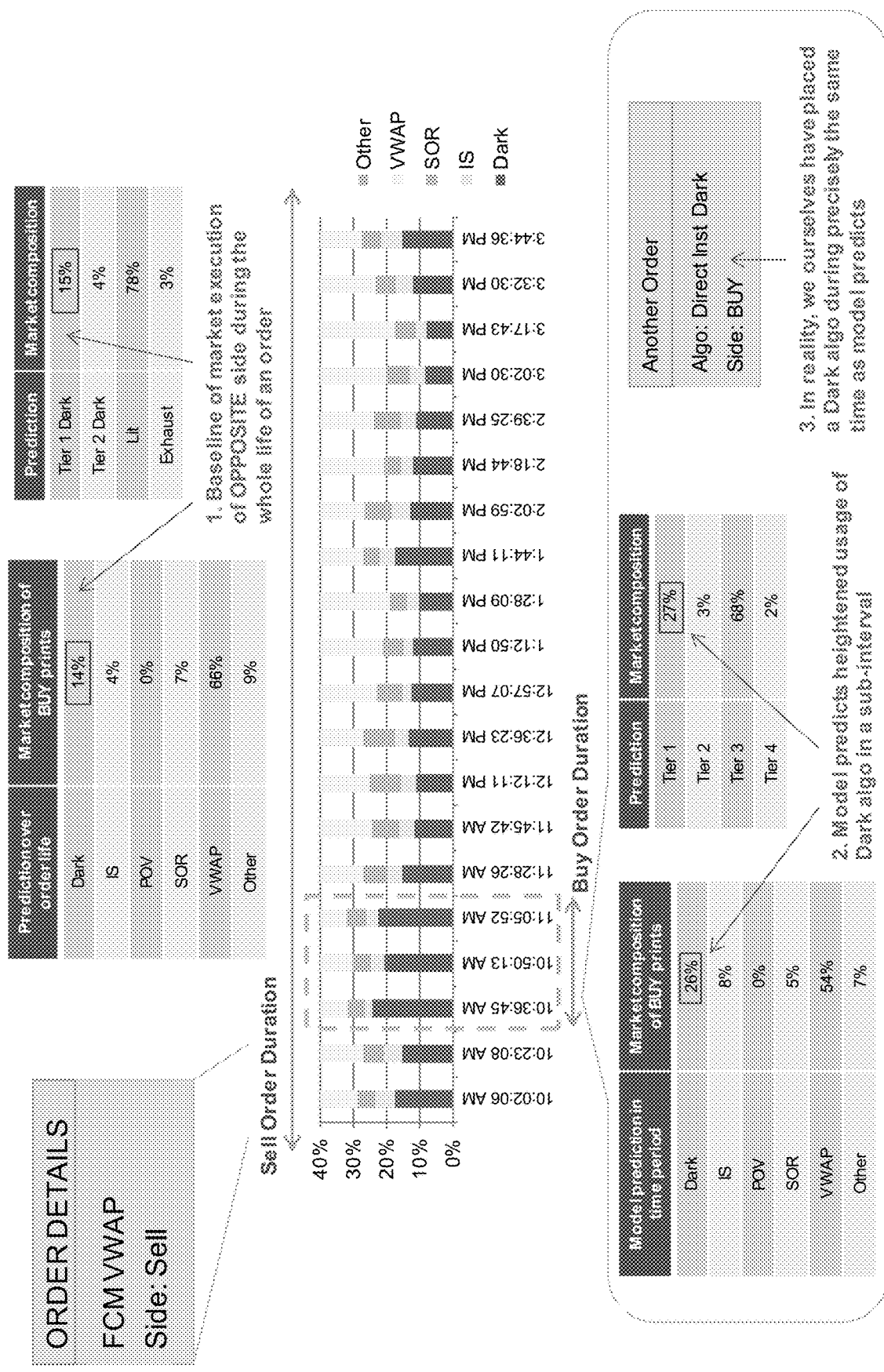
FIGURE 11: AIRTPE IMPLEMENTATION CASE

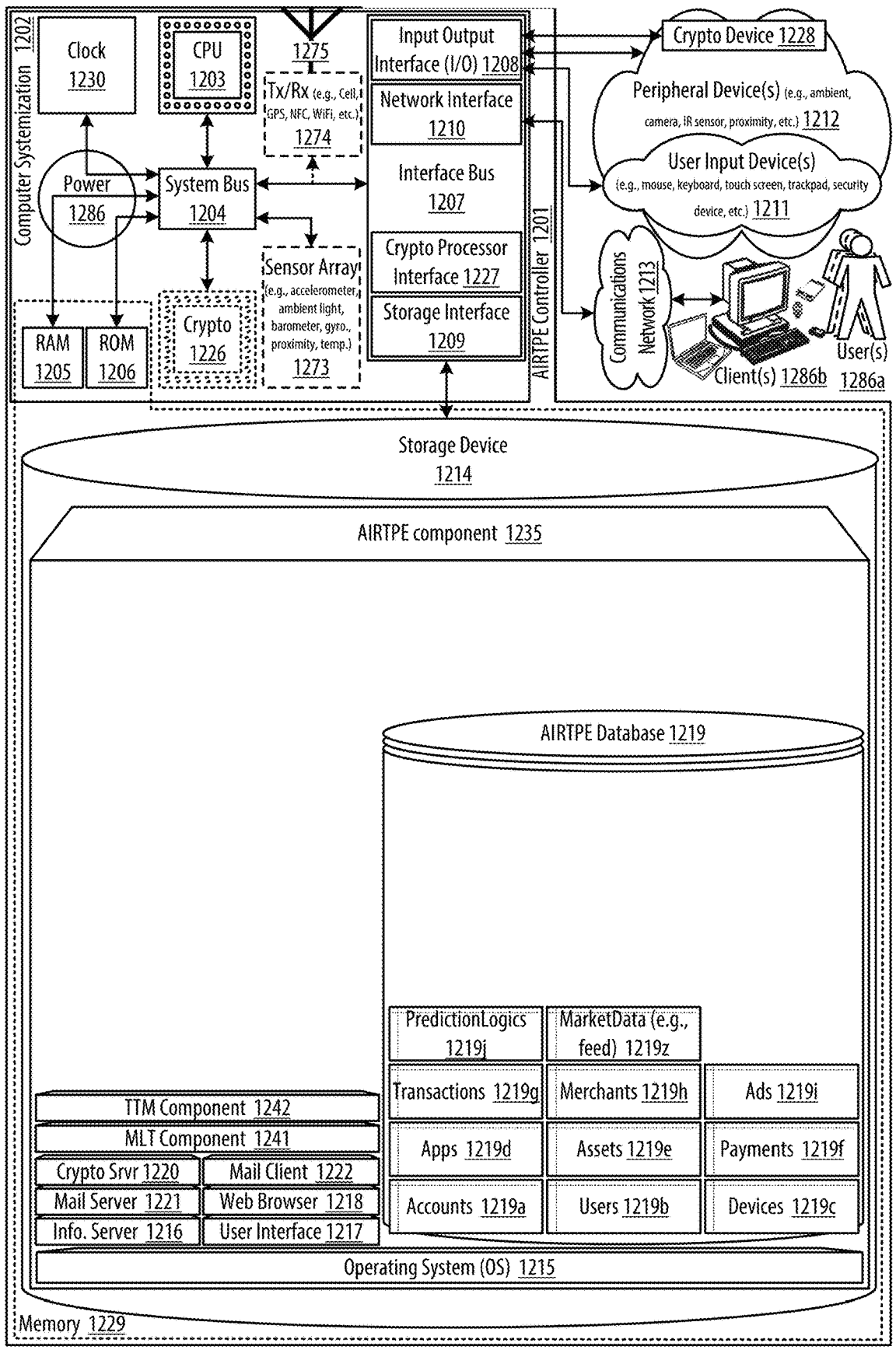
FIGURE 12: AIRTPE Controller

AI-BASED REAL-TIME PREDICTION ENGINE APPARATUSES, METHODS AND SYSTEMS

PRIORITY CLAIM

Applicant hereby claims benefit to priority under 35 USC § 119 as a non-provisional conversion of: US provisional patent application Ser. No. 62/927,085, filed Oct. 28, 2019, entitled "AI-Based Real-Time Prediction Engine Apparatus, Methods and Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address machine learning, and more particularly, include AI-Based Real-Time Prediction Engine Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

People own all types of assets, some of which are secured instruments to underlying assets. People have used exchanges to facilitate trading and selling of such assets. Computer information systems, such as NAICO-NET, Trade*Plus and E*Trade allowed owners to trade securities assets electronically.

BRIEF DESCRIPTION OF THE DRAWINGS

Appendices and/or drawings illustrating various, non-limiting, example, innovative aspects of the AI-Based Real-Time Prediction Engine Apparatuses, Methods and Systems (hereinafter "AIRTPE") disclosure, include:

FIG. 1 shows a datagraph illustrating data flow(s) for the AIRTPE;

FIGS. 2A-C show a logic flow illustrating embodiments of a machine learning training (MLT) component for the AIRTPE;

FIG. 3 shows a datagraph illustrating data flow(s) for the AIRTPE;

FIG. 4 shows a logic flow illustrating embodiments of a trade tick monitoring (TTM) component for the AIRTPE;

FIG. 5 shows a datagraph illustrating data flow(s) for the AIRTPE;

FIGS. 6A-B show logic flows illustrating embodiments of a trade tick monitoring (TTM) component for the AIRTPE;

FIG. 7 shows implementation case(s) for the AIRTPE;

FIG. 8 shows implementation case(s) for the AIRTPE;

FIG. 9 shows implementation case(s) for the AIRTPE;

FIG. 10 shows implementation case(s) for the AIRTPE;

FIG. 11 shows implementation case(s) for the AIRTPE;

FIG. 12 shows a block diagram illustrating embodiments of a AIRTPE controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The AI-Based Real-Time Prediction Engine Apparatuses, Methods and Systems (hereinafter "AIRTPE") transforms machine learning training input, order placement input inputs, via AIRTPE components (e.g., MLT, TTM, etc. components), into machine learning training output, order placement output, information leakage alert outputs. The AIRTPE components, in various embodiments, implement advantageous features as set forth below.

Introduction

The AIRTPE provides unconventional features (e.g., identify important features to enable application of artificial intelligence techniques to infer information from trade prints, such as to infer who and through what means causes a trade print to occur in the equity market) that were never before available in machine learning. In various embodiments, the AIRTPE increases intelligence to understand market participants in a specific trading symbol, creates surveillance capability for clients, alters order entry parameters and/or trading strategies based on counterparty/competitive landscape, and/or the like. In some implementations, the AIRTPE achieves good predictive performance by connecting trade/execution data to market data, performing extensive feature engineering, and discovering suitable artificial intelligence techniques.

Market participants can readily access trade tick data that provides information such as time, symbol, price, size and venue of crosses. However, it is not easy to directly infer who, or through what means, each trade print is associated with. For example, a trade print can be due to a retail submitting a buy order that crosses spread towards ask. Or a trade print can be due to an institution submitting a sell order through a VWAP algo to sell. The AIRTPE provides an artificial intelligence system that deduces this information. By answering the who/what questions the AIRTPE enables a number of applications, such as:

- Surveillance system to detect potential information leakage of active orders
- Signals that feed into logics and alter behavior to improve performance of trading algorithms
- Altering trade instructions as a result of surveying the market before entering a position FIG. 1 shows a datagraph illustrating data flow(s) for the AIRTPE. In FIG. 1, a client 102 (e.g., of an administrator authorized to initiate training) may send a machine learning (ML) training input 121 to a ML training server 104 to facilitate training a real-time prediction logic using a machine learning technique. For example, the client may be a desktop, a laptop, a tablet, a smartphone, a smartwatch, and/or the like that is executing a client application. In one implementation, the ML training input may include data such as a request identifier, a machine learning technique identifier, machine learning technique configuration parameters, a training dataset, training dataset filter criteria, a testing dataset, and/or the like. In one embodiment, the client may provide the following example ML training input, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>AIRTPE.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
```

```
Safari/537.75.14</user_agent_string>
            <client_product_type>MacPro5,1</client_product_type>
            <client_serial_number>YXXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
    </client_details>
    <machine_learning_training_input>
        <request_identifier>ID_request_1</request_identifier>
        <machine_learning_technique_identifier>
            ID_random_forest_classifier
        </machine_learning_technique_identifier>
        <machine_learning_technique_configuration_parameters>
            <max_depth>6</max_depth>
            <n_estimators>1000</n_estimators>
            <class_weight>balanced</class_weight>
            <n_jobs>-1</n_jobs>
        </machine_learning_technique_configuration_parameters>
        <training_dataset>
            <dataset>equities from 7/1/2019 through 7/31/2019</dataset>
            <filter_criteria>stratify over client_id, tier, algo type</filter_criteria>
        </training_dataset>
        <testing_dataset>
            <dataset>equities from 9/1/2019 through 10/31/2019</dataset>
        </testing_dataset>
    </machine_learning_training_input>
</auth_request>
```

The ML training server 104 may send a trade tick data request 125 to a trade tick repository 106 to obtain trade tick and/or quote training data and/or testing data. In one implementation, the trade tick data request may include data such as a request identifier, specification of trade tick data to retrieve, specification of quote data to retrieve, and/or the like. In one embodiment, the ML training server may provide the following example trade tick data request, substantially in the form of a HTTP(S) POST message including XML-formatted data, as provided below:

```
POST /trade_tick_data_request.php HTTP/1.1
Host: www.server.com
Content-Type: Application/XML
Content-Length: 667
<?XML version = "1.0" encoding = "UTF-8"?>
<trade_tick_data_request>
    <request_identifier>ID_request_2</request_identifier>
    <trade_tick_data_to_retrieve>
        sym, time, exch, price, size, trade_qual for equities from
        7/1/2019 through 7/31/2019 for training and from 9/1/2019
        through 10/31/2019 for testing
    </trade_tick_data_to_retrieve>
    <quote_data_to_retrieve>
        quote_time, sym, ask, bid, ask_size, bid_size for equities from
        7/1/2019 through 7/31/2019 for training and from 9/1/2019
        through 10/31/2019 for testing
    </quote_data_to_retrieve>
</trade_tick_data_request>
```

The trade tick repository 106 may send a trade tick data response 129 to the ML training server 104 with the requested trade tick and/or quote training data and/or testing data.

The ML training server 104 may send an order execution data request 133 to an order execution repository 108 to obtain order execution training data and/or testing data. In one implementation, the order execution data request may include data such as a request identifier, specification of order execution data to retrieve, and/or the like. In one embodiment, the ML training server may provide the following example order execution data request, substantially in the form of a HTTP(S) POST message including XML-formatted data, as provided below:

```
POST /order_execution_data_request.php HTTP/1.1
Host: www.server.com
Content-Type: Application/XML
Content-Length: 667
<?XML version = "1.0" encoding = "UTF-8"?>
<order_execution_data_request>
    <request_identifier>ID_request_3</request_identifier>
    <order_execution_data_to_retrieve>
        date, TCARootOrderID, TCAExecutionID, ClientID,
        BusinessType, SideAdjustment, ComponentSenderName, sym,
        price, size, time, LastMarketName, LastMarketClass,
        RootAlgoID, LeafExDestination for equities from 7/1/2019
        through 7/31/2019 for training and from 9/1/2019 through
        10/31/2019 for testing
    </order_execution_data_to_retrieve>
</order_execution_data_request>
```

The order execution repository 108 may send an order execution data response 137 to the ML training server 104 with the requested order execution training data and/or testing data.

A machine learning training (MEI) component 141 may utilize the training data and/or the testing data to train a real-time prediction logic. See FIGS. 2A-C for additional details regarding the MLT component.

The ML training server 104 may send a prediction logic store request 145 to a ML repository 110 to store the trained real-time prediction logic. In one implementation, the prediction logic store request may include data such as a request identifier, a request type, a prediction logic identifier, prediction logic configuration data, and/or the like. In one embodiment, the ML training server may provide the following example prediction logic store request, substantially in the form of a HTTP(S) POST message including XML-formatted data, as provided below:

```
POST /prediction_logic_store_request.php HTTP/1.1
Host: www.server.com
Content-Type: Application/XML
Content-Length: 667
<?XML version = "1.0" encoding = "UTF-8"?>
<prediction_logic_store_request>
    <request_identifier>ID_request_4</request_identifier>
    <request_type>STORE</request_type>
    <prediction_logic_identifier>ID_prediction_logic_1</prediction_logic_identifier>
    <prediction_logic_configuration_data>
        random forest classifier configuration data
    </prediction_logic_configuration_data>
</prediction_logic_store_request>
```

The ML repository 110 may send a prediction logic store response 149 to the ML training server 104 to confirm that the trained real-time prediction logic was stored successfully. In one implementation, the prediction logic store response may include data such as a response identifier, a status, and/or the like. In one embodiment, the ML repository may provide the following example prediction logic store response, substantially in the form of a HTTP(S) POST message including XML-formatted data, as provided below:

```
POST /prediction_logic_store_response.php HTTP/1.1
Host: www.server.com
Content-Type: Application/XML
Content-Length: 667
<?XML version = "1.0" encoding = "UTF-8"?>
<prediction_logic_store_response>
    <response_identifier>ID_response_4</response_identifier>
    <status>OK</status>
</prediction_logic_store_response>
```

The ML training server 104 may send a machine learning training output 153 to the client 102 to inform the administrator that training was completed successfully. In one implementation, the machine learning training output may include data such as a response identifier, a status, and/or the like. In one embodiment, the ML training server may provide the following example machine learning training output, substantially in the form of a HTTP(S) POST message including XML-formatted data, as provided below:

```
POST /machine_learning_training_output.php HTTP/1.1
Host: www.server.com
Content-Type: Application/XML
Content-Length: 667
<?XML version = "1.0" encoding = "UTF-8"?>
<machine_learning_training_output>
    <response_identifier>ID_response_1</response_identifier>
    <status>OK</status>
</machine_learning_training_output>
```

FIG. 2A shows a logic flow illustrating embodiments of a machine learning training (MLT) component for the AIRTPE. In FIG. 2A, a machine learning (ML) training request may be obtained at 201. For example, the ML training request may be obtained as a result of an administrator initiating training and/or testing of a real-time prediction logic.

Historical trade tick data may be retrieved at 205. For example, the historical trade tick data may comprise data similar to the following:

| sym  | time       | exch | price  | size | trade_qual                                |
|------|------------|------|--------|------|-------------------------------------------|
| AAPL | 4:00:00 AM | P    | 203.79 | 28   | Normal:PrePostMkt:OddLot                  |
| AAPL | 4:00:00 AM | P    | 203.9  | 100  | Normal:PrePostMkt:IntermarketSweep        |
| AAPL | 4:01:38 AM | P    | 204.2  | 11   | Normal:PrePostMkt:IntermarketSweep:OddLot |
| AAPL | 4:02:48 AM | P    | 204.2  | 40   | Normal:PrePostMkt:OddLot                  |
| AAPL | 4:03:00 AM | Q    | 204.25 | 3    | Normal:PrePostMkt:OddLot                  |
| AAPL | 4:03:02 AM | Q    | 204.21 | 100  | Normal:PrePostMkt:IntermarketSweep        |
| AAPL | 4:03:03 AM | P    | 204.25 | 97   | Normal:PrePostMkt:OddLot                  |
| AAPL | 4:04:15 AM | P    | 204.4  | 10   | Normal:PrePostMkt:OddLot                  |
| AAPL | 4:04:19 AM | P    | 204.4  | 90   | Normal:PrePostMkt:OddLot                  |

In one implementation, the historical trade tick data may be retrieved from a repository via a trade tick data request.

The historical trade tick data may be augmented at 209 to include additional features from historical quote data. See FIG. 2B for additional details regarding augmenting the historical trade tick data.

Labeled trade tick data may be generated at 213 for use during training (e.g., one month of training data) and/or testing (e.g., two months of testing data with a delay of at least six weeks from the training data) of the real-time prediction logic. For example, the labeled trade tick data may comprise the augmented historical trade tick data with mapped historical order execution data similar to the following:

| feature_name | value    |
|--------------|----------|
| price        | 74.68    |
| size         | 4        |
| a            | 74.69    |
| b            | 74.68    |
| as           | 8        |
| bs           | 10       |
| volAll5      | 232526.1 |
| volAsk5      | 0.345622 |
| volBid5      | 0.369406 |
| volMid5      | 0.346069 |
| volDark5     | 0.335614 |
| volBlock5    | 0.111249 |
| cntAll5      | 1565.451 |
| cntSec5      | 0.032012 |
| cntMin5      | 0.082415 |
| cntQtr5      | 0.052086 |
| cntCent5     | 0.189405 |
| cntSwpAsk5   | 0.142628 |
| cntSwpBid5   | 0.194688 |
| cntDark5     | 0.188148 |

| feature_name | value |
|---|---|
| vwap5 | 74.71516 |
| dev5 | 0.000487 |
| quarter | False |
| cent | False |
| nearMinute | False |
| nearSecond | False |
| cntMs | 1 |
| cntSec | 6 |
| msize | 4 |
| cnt10Ms | 1 |
| cnt100Ms | 2 |
| qdt_30 | False |
| qdt_29 | False |
| ... | ... |
| qdt_2 | False |
| qdt_1 | False |
| qdt0 | False |
| qdt1 | False |
| ... | ... |
| qdt29 | False |
| qdt30 | False |
| Retail | 0.006726 |
| MDV | 11837872 |
| TypicalIntervalSpreadBps | 1.457638 |
| MarketCap | 1.95E+11 |
| ADR | False |
| ETF | False |
| CEF | False |
| Common | True |
| dollar_normalized0_Dark_ATS | 0 |
| dollar_normalized0_Dark_MM | 0 |
| dollar_normalized1_Grey | 0 |
| dollar_normalized2_NYSE | 0 |
| dollar_normalized3_NSDQ | 0 |
| dollar_normalized4_ARCA | 0 |
| dollar_normalized5_BATS | 0 |
| dollar_normalized6_EDGX | 0 |
| dollar_normalized7_IEX | 0 |
| dollar_normalized8_Other | 0 |
| dollar_normalized9_Invert | 0 |
| dollar_normalizedOpen | 0 |
| dollar_normalizedzClose | 0 |
| size_normalized0_Dark_ATS | 0 |
| ... | ... |
| size_normalized1_Grey | 0 |
| size_normalized2_NYSE | 0 |
| size_normalized3_NSDQ | 0 |
| size_normalized4_ARCA | 0 |
| size_normalized5_BATS | 0 |
| size_normalized6_EDGX | 0 |
| size_normalized7_IEX | 0 |
| size_normalized8_Other | 0 |
| size_normalized9_Invert | 0 |
| size_normalizedOpen | 0 |
| size_normalizedzClose | 0 |
| trade_qualifier_AvPrice | 0 |
| trade_qualifier_Cross | 0 |
| trade_qualifier_DerivativelyPriced | 0 |
| trade_qualifier_IntermarketSweep | 1 |
| trade_qualifier_MarketCenterClose | 0 |
| trade_qualifier_MarketCenterOpen | 0 |
| trade_qualifier_Normal | 0 |
| trade_qualifier_OddLot | 1 |
| trade_qualifier_Opened | 0 |
| trade_qualifier_ReOpeningPrints | 0 |
| exchange_B | 0 |
| exchange_C | 0 |
| exchange_DF | 0 |
| exchange_IX | 0 |
| exchange_J | 0 |
| exchange_K | 0 |
| exchange_N | 1 |
| exchange_P | 0 |
| exchange_Q | 0 |
| exchange_X | 0 |
| exchange_Y | 0 |
| exchange_Z | 0 |
| trade_hour_9 | 0 |
| trade_hour_10 | 0 |
| trade_hour_11 | 0 |
| trade_hour_12 | 0 |
| trade_hour_13 | 0 |
| trade_hour_14 | 0 |
| trade_hour_15 | 1 |

In one embodiment, a fuzzy matching logic may be utilized to map execution data to market data. See FIG. 2C for additional details regarding generating the labeled trade tick data.

A subset of the labeled trade tick data to use for machine learning (e.g., for training) may be determined at 217. In one embodiment, the subset of the labeled trade tick data to use for machine learning is selected to avoid overfitting. In one implementation, sampling stratified over a set of buckets (e.g., client_id, tier, algo type, etc.) is utilized to ensure sufficient representation in skewed distributions (e.g., where a small set of clients can account for a very large percentage of the dataset). For example, a random sample may be selected based on a row count basis (e.g., based on a percentage of a bucket that may be from one entity) and/or a value threshold (e.g., no more than 4,000 samples from any one client).

The labeled trade tick data subset may be split into a training set and a testing set at 221. In one implementation, if the labeled trade tick data was not previously separated into training data and testing data, the labeled trade tick data subset may be split (e.g., to use one third of the data for training and two thirds of the data for testing).

A machine learning technique may be used on the training set to train the real-time prediction logic at 225. For example, machine learning techniques such as random forest, gradient boosting, decision tree, logistic regression, and/or the like may be used. In one implementation, a machine learning framework such as scikit-learn may be utilized to train the real-time prediction logic. In various implementations, a machine learning technique may be configured similarly to one of the following:

Random Forest
rf_model = RandomForestClassifier(max_depth=6, n_estimators=1000, class_weight="balanced", n_jobs=−1)
Gradient Boosting
xgb_model = XGBClassifier(max_depth=6, n_estimators=1000, n_jobs=−1)
Decision Tree
dt_model = DecisionTreeClassifier(class_weight="balanced", max_depth=6)

The real-time prediction logic may be tested using the testing set at 229. In one implementation, the real-time prediction logic may determine inferred labels (e.g., who: institutional, retail, direct; where: tier 1 dark, tier 2 dark, lit; what algorithm used: dark, VWAP, SOR; limit price) for the augmented historical trade tick data in the testing set and compare the inferred labels to the actual labels to determine the real-time prediction logic's accuracy. If it is determined at 233 that the real-time prediction logic's performance is not acceptable (e.g., below a specified correctness threshold), training settings may be modified at 237 (e.g., a different machine learning technique may be selected, machine learning technique configuration settings may be adjusted) and a new or improved real-time prediction logic may be trained and/or tested.

If it is determined at 233 that the real-time prediction logic's performance is acceptable (e.g., at or above a specified correctness threshold), the real-time prediction logic may be stored at 241. For example, the real-time prediction logic (e.g., prediction logic configuration data that defines the real-time prediction logic) may be stored in the prediction logics table 1219j. In one implementation, the real-time prediction logic may be stored to a binary, portable file that can be loaded and used on a real-time basis. If the real-time environment has multiple servers handling the request load, each server may independently run this binarized file for predictions.

FIG. 2B shows additional details regarding augmenting the historical trade tick data. In FIG. 2B, historical quote data may be retrieved at 202. For example, the historical quote data may comprise data similar to the following:

| quote_time | sym  | ask    | bid    | ask_size | bid_size |
|------------|------|--------|--------|----------|----------|
| 9:30:00 AM | AAPL | 199.01 | 198.88 | 11       | 2        |
| 9:30:00 AM | AAPL | 199    | 198.88 | 1        | 2        |
| 9:30:00 AM | AAPL | 199.01 | 198.88 | 11       | 1        |
| 9:30:00 AM | AAPL | 199.1  | 198.88 | 29       | 4        |
| 9:30:00 AM | AAPL | 199.01 | 198.88 | 3        | 3        |
| 9:30:00 AM | AAPL | 199.01 | 198.93 | 3        | 1        |
| 9:30:00 AM | AAPL | 199.01 | 198.94 | 3        | 2        |

An as of join of quote data to trade tick data may be performed at 204. In one implementation, the as of join may be performed using one or more Q commands on a kdb+ database. For example, data columns such as sym, trade_time, size, price, exchange, trade_qual, a (ask), b (bid), as (ask size), bs (bid size), core, and/or the like may be obtained.

A label may be added to trade near bid/mid/ask at 206. In one implementation, the label may be added using one or more Q commands on a kdb+ database. For example, the label may be added using commands similar to the following:

```
price=a
price=b
price=0.5*a+b
(trade_qual like "*Sweep*")&price>0.5*a+b
```

A label for venue and/or block trades may be added at 208. In one implementation, the label may be added using one or more Q commands on a kdb+ database. For example, the label may be added using commands similar to the following:
exchange='DF
(exchange='DF)*(size>5000)&(200000<size*price)

A label for trade time may be added at 210. In one implementation, the label may be added using one or more Q commands on a kdb+ database. For example, the label may be added using commands similar to the following:
30>trade_time mod 1000

Price features may be added at 212. In one implementation, the price features may be added using one or more Q commands on a kdb+ database. For example, the price features may be added using commands similar to the following:
0=1 xbar (100*price) mod 25

Print uniqueness features may be added at 214. In one implementation, the print uniqueness features may be added using one or more Q commands on a kdb+ database. For example, print uniqueness features such as near minute, near second, quote stability, and/or the like may be added.

Exponent moving average features may be added and/or data may be normalized (e.g., to adjust values to a common scale) at 216. In one implementation, the features may be added and/or data may be normalized using one or more Q commands on a kdb+ database. For example, the exponent moving average features may be added using commands similar to the following:

```
vems[5min; factor] compute exponential moving sum for factor at with 5
minute interval.
trd: update emafactors: flip vems[300000;;dt] peach (`float$size;
`float$size*price=a; `float$size*price=b; `float$size*price=0.5*a+b;
`float$size*exchange=`DF;
`float$size*(exchange=`DF)*(size>5000)&(200000<size*price); price*size;
price*price*size; (count i)#1f; `float$30>trade_time mod 1000;
`float$3000>trade_time
mod 60000; `float$0=1 xbar (100*price) mod 25; `float$0=1 xbar
(100*price) mod 10;
(trade_qual like "*Sweep*")&price>0.5*a+b; (trade_qual like
"*Sweep*")&price<0.5*a+b; exchange=`DF) by sym from trd;
```

FIG. 2C shows additional details regarding generating the labeled trade tick data. In FIG. 2C, historical order execution data may be retrieved at 222. For example, the historical order execution data may comprise data similar to the following:

| column_name       | value                                      |
|-------------------|--------------------------------------------|
| date              | 2019.10.08                                 |
| TCARootOrderID    | "1104n_18177_272398_20191008_RouteHub"     |
| TCAExecutionID    | "ab4_2458765_1081384_20191008_RouteHub"    |
| ClientID          | '1                                         |
| BusinessType      | 'N                                         |
| SideAdjustment    | −1                                         |
| ComponentSenderName | "POST LIT"                               |
| sym               | 'AVT                                       |
| price             | 40.05                                      |
| size              | 66                                         |
| time              | 12:53:34.954                               |
| LastMarketName    | "NASDAQ (LastKnown, Tag30 missing)"        |
| LastMarketClass   | "EXCHANGE/ECN (LastKnown, Tag30 missing)"  |
| RootAlgoID        | 'HELMVWAPN                                 |
| LeafExDestination | 'NSDQ_DAY                                  |

In one implementation, the historical order execution data may be retrieved from a repository via an order execution data request.

Exchange codes may be inferred from the historical order execution data based on venue at 224. In one implementation, the exchange codes may be inferred using one or more Q commands on a kdb+ database. For example, the exchange codes may be inferred using commands similar to the following:

```
exc: update exchange: marketnamemap LastMarketName from exc;
exc: update exchange: `DF from exc where (LastMarketClass like
"DARK POOL")
```

Predicted labels may be created based on the historical order execution data at 226. In one implementation, the predicted labels may be created using one or more Q commands on a kdb+ database. For example, the predicted labels may be created using commands similar to the following:

```
rmap: update Product: `SOR from rmap where ClientProduct like
"*ROUTER*";
rmap: update Product: `VWAP from rmap where ClientProduct like
"*VWAP*";
rmap: update Product: `TWAP from rmap where ClientProduct like
"*TWAP*";
rmap: update Product: `Dark from rmap where ClientProduct like
"*DARK*";
exc: update Tier: `1Retail from exc where ClientType=`Retail,
LastMarketClass like "DARK POOL*";
exc: update Tier: `Lit from exc where LastMarketClass like
"EXCHANGE*";
```

For example, the following predicted labels may be utilized:

| Predicted algo type | Predicted client type | Predicted tier | Predicted state | Predicted venue |
|---|---|---|---|---|
| SOR | Institutional | Tier 1 Dark | Neutral | BARC LX |
| TWAP | Service Bureau | Tier 2 Dark | Aggressive | BIDS |
| VWAP | RIA | Lit | Passive | BOFA INSTINCT X |
| DARK | Retail | Exhaust from | | CITI CROSS |
| POV | FamilyOffice | Market Maker | | CSFB CROSSFINDER |
| LSA | MarketMaker | | | DB SUPERX |
| IS | | | | FCM CROSSSTREAM |
| Block | | | | GS SIGMAX2 |
| Close | | | | INSTINET CBX |
| DMA | | | | ITG POSIT |
| Desk | | | | JPM-X |
| Dark | | | | LEVEL ATS |
| Other | | | | MS POOL |
| | | | | MS RETAIL POOL |
| | | | | UBS ATS |
| | | | | UBS PIN |
| | | | | VIRTU LINK |
| | | | | VIRTU MATCHIT |

A time with buffer column of the historical order execution data may be flipped (e.g., transposed using the Q flip command) at 228. In one embodiment, time reported by different systems (e.g., different venues, the AIRTPE) is different. Accordingly, a buffer (e.g., which may be added to the reported time) may be specified for each system to facilitate aligning times reported by different systems. In one implementation, the buffers may be specified using one or more Q commands on a kdb+ database. For example, the buffers may be specified using commands similar to the following:

```
exc: select from exc where not null exchange;
exc: update buffer: 00:00:00.010 from exc where LastMarketClass like
"EXCHANGE/ECN*";
exc: update buffer: 00:00:00.050 from exc where LastMarketClass like
"DARK POOL*";
```

A time column of the augmented historical trade tick data may be flipped (e.g., transposed using the Q flip command) at 230.

An as of join of the historical order execution data with the augmented historical trade tick data may be performed at 232 to generate labeled trade tick data. In one embodiment, the as of join may be performed by matching each execution to a nearest future reported print in the Securities Information Processor (SIP) based on columns such as price, size, exchange and core print identifier. In one implementation, the as of join may be performed using one or more Q commands on a kdb+ database. For example, the as of join may be performed using commands similar to the following:

```
ajG[select from exc where sym=x;delete sym from select from trd where
sym=x;`price`size`exchange`core;`rt]
```

The labeled trade tick data may be stored (e.g., in memory, in a repository) at 234.

A determination may be made at 236 whether there exists residual historical order execution data unmatched with the augmented historical trade tick data. If so, the residual historical order execution data may be grouped on similar time at 238. For example, sometimes multiple executions are reported as a single print in the market. In one implementation, the residual historical order execution data may be grouped into 10 millisecond time chunks. For example, the residual historical order execution data may be grouped using commands similar to the following:

```
excgrp: 0!select first TCAExecutionID, sum size, max buffer, max rt by
date, TCARootOrderID, ClientID, BusinessType, SideAdjustment,
ComponentSenderName, sym, price, 10 xbar time, LastMarketName,
LastMarketClass, RootAlgoID, LeafExDestination, exchange, core from
excj where null trade_time, trade_time < time+00:00:20;
```

An as of join of the grouped residual historical order execution data with the augmented historical trade tick data may be performed at 240. In one implementation, an additional buffer (e.g., of 300 milliseconds) may be added before joining to account for additional delay. For example, the as of join may be performed using commands similar to the following:

```
ajG[update rt: rt+00:00:00.300 from select from excgrp where
sym=x;delete sym, size from update msize: size from select from
trd where sym=x;`price`exchange`core;`rt]
```

The additional labeled trade tick data may be stored (e.g., in memory, in a repository) at 242.

A determination may be made at 244 whether there exists residual historical order execution data unmatched with the augmented historical trade tick data. If so, venue labels on the residual historical order execution data may be fixed at 246 (e.g., market makers can sometimes do a DF print when LastMarket seems to be exchange). For example, the venue labels on the residual historical order execution data may be fixed using commands similar to the following:

```
update exchange: `DF from select from excgrp where null trade_time,
LeafExDestination like "*MM_*", trade_time < time+00:00:20;
```

An as of join of the fixed residual historical order execution data with the augmented historical trade tick data may be performed at 248. In one implementation, an additional buffer (e.g., of 300 milliseconds) may be added before joining to account for additional delay.

The additional labeled trade tick data may be stored (e.g., in memory, in a repository) at 250.

Symbol level features may be determined from the historical order execution data at 252. For example, the symbol level features may include median daily volume, market cap, typical spread, retail interest, institutional interest, Is ETF?, Is CEF?, Is ADR?, ATS statistics, and/or the like. In one implementation, the symbol level features may be determined using one or more Q commands on a kdb+ database. For example, the symbol level features may be determined using commands similar to the following:

```
symfactor: select MDV: first MedianDailyVolume21Day, avg
TypicalIntervalSpreadBps, first MarketCap, first SecurityType by sym:
Symbol from Order where date=d, IsRoot=1b, IsIndividualOrder=1b,
OrderQuantityPctMDV>0, TypicalIntervalSpreadBps>0;
symfactor: update ADR: 1b from symfactor where SecurityType like
"ADR";
symfactor: update ETF: 1b from symfactor where SecurityType like
"ETP";
symfactor: update CEF: 1b from symfactor where SecurityType like
"Close-End Fund";
symfactor: update Common: 1b from symfactor where SecurityType like
"Common Stock";
```

The labeled trade tick data may be updated with the symbol level features at 254. In one implementation, the updated labeled trade tick data may be used during training and/or testing of the real-time prediction logic.

FIG. 3 shows a datagraph illustrating data flow(s) for the AIRTPE. In FIG. 3, an AIRTPE server 304 may send a prediction logic retrieve request 321 to a ML repository 306 to retrieve a trained real-time prediction logic. In one implementation, the prediction logic retrieve request may include data such as a request identifier, a request type, a prediction logic identifier, and/or the like. In one embodiment, the AIRTPE server may provide the following example prediction logic retrieve request, substantially in the form of a HTTP(S) POST message including XML-formatted data, as provided below:

```
POST /prediction_logic_retrieve_request.php HTTP/1.1
Host: www.server.com
Content-Type: Application/XML
Content-Length: 667
<?XML version = "1.0" encoding = "UTF-8"?>
<prediction_logic_retrieve_request>
    <request_identifier>ID_request_11</request_identifier>
    <request_type>RETRIEVE</request_type>
    <prediction_logic_identifier>ID_prediction_logic_1</prediction_logic_identifier>
</prediction_logic_retrieve_request>
```

The ML repository 306 may send a prediction logic retrieve response 325 to the AIRTPE server 304 with the requested prediction logic configuration data. In one implementation, the prediction logic retrieve response may include data such as a response identifier, the requested prediction logic configuration data, and/or the like. In one embodiment, the ML repository may provide the following example prediction logic retrieve response, substantially in the form of a HTTP(S) POST message including XML-formatted data, as provided below:

```
POST /prediction_logic_retrieve_response.php HTTP/1.1
Host: www.server.com
Content-Type: Application/XML
Content-Length: 667
<?XML version = "1.0" encoding = "UTF-8"?>
<prediction_logic_retrieve_response>
    <response_identifier>ID_response_11</response_identifier>
    <prediction_logic_configuration_data>
        random forest classifier configuration data
    </prediction_logic_configuration_data>
</prediction_logic_retrieve_response>
```

A client 302 (e.g., of a user) may send an order placement input 329 to the AIRTPE server 304 to facilitate placing an order (e.g., for a specified security). For example, the client may be a desktop, a laptop, a tablet, a smartphone, a smartwatch, and/or the like that is executing a client application. In one implementation, the order placement input may include data such as a request identifier, order details, and/or the like. In one embodiment, the client may provide the following example order placement input, substantially in the form of a HTTP(S) POST message including XML-formatted data, as provided below:

```
POST /order_placement_input.php HTTP/1.1
Host: www.server.com
Content-Type: Application/XML
Content-Length: 667
<?XML version = "1.0" encoding = "UTF-8"?>
<order_placement_input>
    <request_identifier>ID_request_12</request_identifier>
    <order_details>
        <security_identifier>AAPL</security_identifier>
        <action>BUY</action>
        <quantity>1500 shares</quantity>
        <order_type>LIMIT</order_type>
        <limit_price>$10</limit_price>
        <algo_identifier>id_trading_algorithm_1</algo_identifier>
    </order_details>
</order_placement_input>
```

The AIRTPE server 304 may send an order placement request 333 to an exchange server 310 to facilitate placing the order (e.g., in accordance with an order placement allocation determined by the specified trading algorithm). For example, one or more order placement requests may be sent (e.g., over time) to one or more exchange servers (e.g., for one or more venues) in accordance with the order placement allocation. In one implementation, the order placement request may include data such as a request identifier, order details, and/or the like. In one embodiment, the AIRTPE server may provide the following example order placement request, substantially in the form of a HTTP(S) POST message including XML-formatted data, as provided below:

```
POST /order_placement_request.php HTTP/1.1
Host: www.server.com
Content-Type: Application/XML
Content-Length: 667
<?XML version = "1.0" encoding = "UTF-8"?>
<order_placement_request>
    <request_identifier>ID_request_13</request_identifier>
    <order_details>
        <venue>Dark Pool</venue>
        <security_identifier>AAPL</security_identifier>
        <action>BUY</action>
        <quantity>2000 shares</quantity>
        <order_type>LIMIT</order_type>
        <limit_price>$10</limit_price>
    </order_details>
</order_placement_request>
```

The exchange server 310 may send an order placement response 337 to the AIRTPE server 304 to confirm that the order was placed successfully. In one implementation, the order placement response may include data such as a response identifier, a status, and/or the like. In one embodiment, the exchange server may provide the following example order placement response, substantially in the form of a HTTP(S) POST message including XML-formatted data, as provided below:

```
POST /order_placement_response.php HTTP/1.1
Host: www.server.com
Content-Type: Application/XML
Content-Length: 667
<?XML version = "1.0" encoding = "UTF-8"?>
<order_placement_response>
    <response_identifier>ID_response_13</response_identifier>
    <status>OK</status>
</order_placement_response>
```

The AIRTPE server 304 may send an order placement output 341 to the client 302 to inform the user that the order was placed successfully. In one implementation, the order placement output may include data such as a response identifier, a status, and/or the like. In one embodiment, the AIRTPE server may provide the following example order placement output, substantially in the form of a HTTP(S) POST message including XML-formatted data, as provided below:

```
POST /order_placement_output.php HTTP/1.1
Host: www.server.com
Content-Type: Application/XML
Content-Length: 667
```

-continued

```
<?XML version = "1.0" encoding = "UTF-8"?>
<order_placement_output>
    <response_identifier>ID_response_12</response_identifier>
    <status>OK</status>
</order_placement_output>
```

A trade tick server 308 (e.g., a market data server) may send (e.g., in real-time) trade tick data messages 345 to the AIRTPE server 304 with trade tick data and/or quote data (e.g., for the specified security).

A trade tick monitoring (TTM) component 349 may utilize data provided in received trade tick data messages to facilitate sending information leakage alerts to the user and/or to facilitate modifying order placement instructions. See FIG. 4 for additional details regarding the TTM component.

If information leakage is detected, the AIRTPE server 304 may send an information leakage alert 353 to the client 302 to inform the user regarding the information leakage. In one implementation, the information leakage alert may include data such as a response identifier, a status, and/or the like. In one embodiment, the AIRTPE server may provide the following example information leakage alert, substantially in the form of a HTTP(S) POST message including XML-formatted data, as provided below:

```
POST /information_leakage_alert.php HTTP/1.1
Host: www.server.com
Content-Type: Application/XML
Content-Length: 667
<?XML version = "1.0" encoding = "UTF-8"?>
<information_leakage_alert>
    <alert_identifier>ID_alert_14</alert_identifier>
    <status>Alert - trading algorithm can be inferred by others</status>
</information_leakage_alert>
```

FIG. 4 shows a logic flow illustrating embodiments of a trade tick monitoring (TTM) component for the AIRTPE. In FIG. 4, an order placement datastructure may be obtained at 401. For example, the order placement datastructure may be obtained as a result of a user sending an order placement input to facilitate placing an order (e.g., for a specified security).

An order placement allocation may be determined at 405. For example, the order placement allocation may specify how to place one or more orders in one or more venues to achieve the user's objective (e.g., purchase 1500 shares of AAPL stock with limit price of $10). In one embodiment, the order placement allocation may be determined by a specified trading algorithm based on factors such as the user's objective, realized execution, additional market factors and signals, and/or the like. In one implementation, before incorporating information leakage, a decision grid based on two factors (e.g., supply and demand) similar to the following may be utilized to determine the order placement allocation:

|  | Demand | | | | | |
|---|---|---|---|---|---|---|
| Factor | <0 | 0-a % | a-b % | b-c % | c-d % | >d % |
| Low Liquidity | Stop | Tight | Selective | Liquidity Seeking | Risk Control | Aggressive |
| Neutral | Stop | Tight | Very Selective | Selective | Liquidity Seeking | Risk Control |
| Large Counterparty | Stop | Tight | Very Selective | Very Selective | Selective | Liquidity Seeking | where a sample mapping from the grid value to the actual algo placements may be similar to the following:

| Nodes (StMgr 9001) | Very Selective | Selective | Risk Control | Aggressive |
|---|---|---|---|---|
| Conditional | X | X | X | X |
| Favorable Price |  |  | X | X |
| IOC Market T2 |  |  |  | X |
| IOC Market T1 |  |  | X | X |
| IOC Mid T2 | X | X | X | X |
| IOC Mid T1 | X | X | X | X |
| Post Lit |  | X | X | X |
| Peg Mid T2 |  |  |  | X |
| Peg Mid T1 |  | X | X | X |
| Peg Primary T2 |  | X | X | X |
| Retail | X | X | X | X |
| Peg Primary T1 | X | X | X | X |

For example, the order placement allocation may be similar to the following:
  Put 2000 shares in as Peg Primary order in Dark Pool with a limit price of $10
  Every 10-30 seconds, send 300 shares as Immediate-or-Cancel (IOC) order to mid point in dark pool
  Upon favorable price signal, take far side in lit market for 500 shares One or more order placement request datastructures may be sent to one or more exchange servers at 409. In one implementation, order placement requests may be sent in accordance with the order placement allocation.

A determination may be made at 413 whether the order has been filled. If the order has not been filled yet, a trade tick data message (e.g., with trade tick data and/or quote data) may be obtained at 417. For example, the trade tick data message may include similar data as described with regard to historical trade tick data at 205 and/or with regard to historical quote data at 202.

Inferred labels for the print associated with the trade tick data message may be determined using a real-time prediction logic (e.g., a specified trained random forest estimator) at 421. In one embodiment, as prints occur in the market, in real-time, the AIRTPE predicts inferred labels (e.g., who: institutional, retail, direct; where: tier 1 dark, tier 2 dark, lit; what algorithm used: dark, VWAP, SOR; limit price) for each print. The inferred labels may be compared to the actual execution of the order to assess information leakage.

Inferred labels for trade tick data messages (e.g., received since the order placement datastructure was obtained) may be grouped into time buckets at 425. For example, the Q cut command may be utilized for grouping trade tick data. In one implementation, a time bucket of a specific size may be utilized (e.g., 1 second). In another implementation, a set of different time bucket sizes may be tried (e.g., 100 ms, 1 second, 10 seconds). A determination may be made at 429 whether the inferred labels (e.g., for a selected time bucket size) correspond to execution data generated by the order. If so, an allocation information leakage alert may be sent at 433. For example, the allocation information leakage alert may inform the user that information about the user's order (e.g., algorithm used, such as VWAP) can be inferred by someone reading the tape. A determination may be made at 437 whether the AIRTPE is configured to take a corrective action in response to the allocation information leakage. If so, the order placement allocation for the order may be modified at 441. For example, the trading algorithm may be configured to modify algo placements (e.g., use a different type of algo, use a different vendor) as the corrective action. In one implementation, after incorporating information leakage, a decision grid similar to the following may be utilized to determine the modified order placement allocation:

|  | Info leakage factor | Demand | | | | | |
|---|---|---|---|---|---|---|---|
| Factor |  | <0 | 0-a % | a-b % | b-c % | c-d % | >d % |
| Low Liquidity | low chance | Stop | Tight | Selective | Liquidity Seeking | Risk Control | Aggressive |
|  | high chance | Stop | Tight | Very Selective | Very Selective | Selective | Liquidity Seeking |
| Neutral | low chance | Stop | Tight | Very Selective | Selective | Liquidity Seeking | Risk Control |
|  | high chance | Stop | Tight | Very Selective | Very Selective | Very Selective | Selective |
| Large Counterparty | low chance | Stop | Tight | Very Selective | Very Selective | Selective | Liquidity Seeking |
|  | high chance | Stop | Tight | Tight | Tight | Very Selective | Selective |

Inferred labels for trade tick data messages (e.g., received since the order placement datastructure was obtained) may be grouped into price buckets at 445. For example, the Q cut command may be utilized for grouping trade tick data. In one implementation, a price bucket may be defined based on an exact price match. In another implementation, a price bucket may be defined based on a percentage difference threshold (e.g., prices within 1% of each other). A determination may be made at 449 whether the inferred labels (e.g., for the defined price bucket) correspond to execution data generated by the order. If so, a limit price information leakage alert may be sent at 453. For example, the limit price information leakage alert may inform the user that information about the user's order (e.g., the limit price) can be inferred by someone reading the tape. A determination may be made at 457 whether the AIRTPE is configured to take a corrective action in response to the limit price information leakage. If so, the limit price for the order may be modified at 461. For example, the limit price may be changed by a random amount up to a specified limit (e.g., increase or decrease the limit price up to 5%).

FIG. 5 shows a datagraph illustrating data flow(s) for the AIRTPE. In FIG. 5, an AIRTPE server 504 may send a prediction logic retrieve request 521 to a ML repository 506 to retrieve a trained real-time prediction logic. In one implementation, the prediction logic retrieve request may include data such as a request identifier, a request type, a prediction logic identifier, and/or the like. In one embodiment, the AIRTPE server may provide the following example prediction logic retrieve request, substantially in the form of a HTTP(S) POST message including XML-formatted data, as provided below:

```
POST /prediction_logic_retrieve_request.php HTTP/1.1
Host: www.server.com
Content-Type: Application/XML
Content-Length: 667
<?XML version = "1.0" encoding = "UTF-8"?>
<prediction_logic_retrieve_request>
    <request_identifier>ID_request_21</request_identifier>
    <request_type>RETRIEVE</request_type>
    <prediction_logic_identifier>ID_prediction_logic_1</prediction_logic_identifier>
</prediction_logic_retrieve_request>
```

The ML repository 506 may send a prediction logic retrieve response 525 to the AIRTPE server 504 with the requested prediction logic configuration data. In one implementation, the prediction logic retrieve response may include data such as a response identifier, the requested prediction logic configuration data, and/or the like. In one embodiment, the ML repository may provide the following example prediction logic retrieve response, substantially in the form of a HTTP(S) POST message including XML-formatted data, as provided below:

```
POST /prediction_logic_retrieve_response.php HTTP/1.1
Host: www.server.com
Content-Type: Application/XML
Content-Length: 667
<?XML version = "1.0" encoding = "UTF-8"?>
<prediction_logic_retrieve_response>
    <response_identifier>ID_response_21</response_identifier>
    <prediction_logic_configuration_data>
        random forest classifier configuration data
    </prediction_logic_configuration_data>
</prediction_logic_retrieve_response>
```

A client 502 (e.g., of a user) may send an order placement input 529 to the AIRTPE server 504 to facilitate placing an order (e.g., for a specified security). For example, the client may be a desktop, a laptop, a tablet, a smartphone, a smartwatch, and/or the like that is executing a client application. In one implementation, the order placement input may include data such as a request identifier, order details, and/or the like. In one embodiment, the client may provide the following example order placement input, substantially in the form of a HTTP(S) POST message including XML-formatted data, as provided below:

```
POST /order_placement_input.php HTTP/1.1
Host: www.server.com
Content-Type: Application/XML
Content-Length: 667
<?XML version = "1.0" encoding = "UTF-8"?>
<order_placement_input>
    <request_identifier>ID_request_22</request_identifier>
    <order_details>
        <security_identifier>AAPL</security_identifier>
        <action>BUY</action>
        <quantity>1500 shares</quantity>
        <order_type>LIMIT</order_type>
        <limit_price>$10</limit_price>
        <algo_identifier>id_trading_algorithm_1</algo_identifier>
    </order_details>
</order_placement_input>
```

A trade tick server 508 (e.g., a market data server) may send (e.g., in real-time) trade tick data messages 533 to the AIRTPE server 504 with trade tick data and/or quote data (e.g., for the specified security).

A trade tick monitoring (TTM) component 537 may utilize data provided in received trade tick data messages to facilitate modifying order placement allocation for the order. See FIGS. 6A-B for additional details regarding the TTM component.

The AIRTPE server 504 may send an order placement request 541 to an exchange server 510 to facilitate placing the order (e.g., in accordance with the modified order placement allocation determined by the specified trading algorithm). For example, one or more order placement requests may be sent (e.g., over time) to one or more exchange servers (e.g., for one or more venues) in accordance with the modified order placement allocation. In one implementation, the order placement request may include data such as a request identifier, order details, and/or the like. In one embodiment, the AIRTPE server may provide the following example order placement request, substantially in the form of a HTTP(S) POST message including XML-formatted data, as provided below:

```
POST /order_placement_request.php HTTP/1.1
Host: www.server.com
Content-Type: Application/XML
Content-Length: 667
<?XML version = "1.0" encoding = "UTF-8"?>
<order_placement_request>
    <request_identifier>ID_request_23</request_identifier>
    <order_details>
        <venue>Dark Pool</venue>
        <security_identifier>AAPL</security_identifier>
        <action>BUY</action>
        <quantity>2500 shares</quantity>
```

-continued

```
        <order_type>LIMIT</order_type>
        <limit_price>$10</limit_price>
    </order_details>
</order_placement_request>
```

The exchange server 510 may send an order placement response 545 to the AIRTPE server 504 to confirm that the order was placed successfully. In one implementation, the order placement response may include data such as a response identifier, a status, and/or the like. In one embodiment, the exchange server may provide the following example order placement response, substantially in the form of a HTTP(S) POST message including XML-formatted data, as provided below:

```
POST /order_placement_response.php HTTP/1.1
Host: www.server.com
Content-Type: Application/XML
Content-Length: 667
<?XML version = "1.0" encoding = "UTF-8"?>
<order_placement_response>
    <response_identifier>ID_response_23</response_identifier>
    <status>OK</status>
</order_placement_response>
```

The AIRTPE server 504 may send an order placement output 549 to the client 502 to inform the user that the order was filled successfully. In one implementation, the order placement output may include data such as a response identifier, a status, and/or the like. In one embodiment, the AIRTPE server may provide the following example order placement output, substantially in the form of a HTTP(S) POST message including XML-formatted data, as provided below:

```
POST /order_placement_output.php HTTP/1.1
Host: www.server.com
Content-Type: Application/XML
Content-Length: 667
<?XML version = "1.0" encoding = "UTF-8"?>
<order_placement_output>
    <response_identifier>ID_response_22</response_identifier>
    <status>OK</status>
</order_placement_output>
```

FIGS. 6A-B show logic flows illustrating embodiments of a trade tick monitoring (TTM) component for the AIRTPE. In FIG. 6A, a trade tick data message (e.g., with trade tick data and/or quote data) for a security may be obtained at 601. For example, trade tick data messages may be obtained to facilitate computing a real-time liquidity model for the security.

Inferred labels for the print associated with the trade tick data message may be determined using a real-time prediction logic (e.g., a specified trained random forest estimator) at 605. In one embodiment, as prints occur in the market, in real-time, the AIRTPE predicts inferred labels (e.g., who: institutional, retail, direct; where: tier 1 dark, tier 2 dark, lit; what algorithm used: dark, VWAP, SOR; limit price) for each print.

A real-time liquidity model for the security may be computed at 609. In one implementation, the inferred labels may be analyzed (e.g., for both buy and sell side) to compute percentages of orders that are executed in different markets (e.g., dark markets, lit markets) and/or that are executed using different algorithms (e.g., VWAP, dark). For example, the real-time liquidity model for the security may indicate that 40% of buy orders execute in dark markets using dark algorithms, 20% of buy orders execute in dark markets using a liquidity seeking algorithm, and 40% of buy orders execute in lit markets using VWAP algorithm.

A determination may be made at 613 whether an order for the security was received (e.g., as a result of a user sending an order placement input). If so, an order placement allocation may be determined at 617. For example, the order placement allocation may specify how to place one or more orders in one or more venues to achieve the user's objective (e.g., purchase 1500 shares of AAPL stock with limit price of $10). In one embodiment, the order placement allocation may be determined by a specified trading algorithm based on factors such as client objective, realized execution, additional market factors and signals, and/or the like. For example, the order placement allocation may be similar to the following:

Put 2000 shares in as Peg Primary order in Dark Pool with a limit price of $10

Every 10-30 seconds, send 300 shares as Immediate-or-Cancel (IOC) order to mid point in dark pool Upon favorable price signal, take far side in lit market for 500 shares Counterparty landscape may be assessed at 621. For example, if the order is a buy order, the real-time liquidity model for the security may be used to determine where inferred sell orders are placed and/or using which algorithms, and/or to determine where inferred buy orders that may compete with the specified trading algorithm for the buy order are placed and/or using which algorithms.

An internal algorithmic state of the specified trading algorithm for the order may be modified based on the counterparty landscape at 625. In one implementation, the internal algorithmic state may be modified to favor markets with higher liquidity. For example, if the order is a buy order and the counterparty landscape indicates that most sell orders are placed in dark markets, the internal algorithmic state may be changed to "favor dark". In another implementation, the internal algorithmic state may be modified to indicate which other algorithm to outperform. For example, if the order is a buy order and the counterparty landscape indicates that other competing buy orders use "aggressive" algorithms, the internal algorithmic state may be changed to "beat competition".

The order placement allocation may be modified based on the modified internal algorithmic state at 629. For example, if the order is a buy order and the internal algorithmic state was changed to "favor dark", the order placement allocation may be modified to use more peg primary in dark, IOC or peg mid in dark, or IOC market orders to discover counterparty. In another example, if the order is a buy order and the internal algorithmic state was changed to "beat competition", the order placement allocation may be modified to take far side lit liquidity to lock in prices before trading cost increases as liquidity gets taken by competitors. In some implementations, instead of modifying a previously determined order placement allocation, the order placement allocation may be initially determined using the modified internal algorithmic state.

One or more order placement request datastructures may be sent to one or more exchange servers at 633. In one implementation, order placement requests may be sent in accordance with the modified order placement allocation. For example, the modified order placement allocation may be similar to the following:

Put 2500 shares in as Peg Primary order in Dark Pool with a limit price of $10

Every 10-30 seconds, send 300 shares as Immediate-or-Cancel (IOC) order to mid point in dark pool Upon favorable price signal, take far side in lit market for 1000 shares In FIG. 6B, a trade tick data message (e.g., with trade tick data and/or quote data) for a security may be obtained at 651. For example, trade tick data messages may be obtained to facilitate detecting information leakage for the security.

Inferred labels for the print associated with the trade tick data message may be determined using a real-time prediction logic (e.g., a specified trained random forest estimator) at 655. In one embodiment, as prints occur in the market, in real-time, the AIRTPE predicts inferred labels (e.g., who: institutional, retail, direct; where: tier 1 dark, tier 2 dark, lit; what algorithm used: dark, VWAP, SOR; limit price) for each print.

A real-time liquidity model for the security may be computed at 659. In one implementation, the inferred labels may be analyzed (e.g., for both buy and sell side) to compute percentages of orders that are executed in different markets (e.g., dark markets, lit markets) and/or that are executed using different algorithms (e.g., VWAP, dark). For example, the real-time liquidity model for the security may indicate that 40% of buy orders execute in dark markets using dark algorithms, 20% of buy orders execute in dark markets using a liquidity seeking algorithm, and 40% of buy orders execute in lit markets using VWAP algorithm In another implementation, the inferred labels may be analyzed (e.g., for both buy and sell side) to detect limit prices set by market participants. For example, the real-time liquidity model for the security may indicate inferred limit prices in various venues.

Counterparty landscape may be assessed at 663. For example, the real-time liquidity model for the security may be used to determine where inferred sell orders are placed and/or using which algorithms and/or at which limit prices, and/or to determine where inferred buy orders are placed and/or using which algorithms and/or at which limit prices.

A determination may be made at 667 whether information leakage for the security has been detected. For example, information leakage may allow a trading algorithm to place an order for the security that results in a superior order execution (e.g., faster execution, improved profitability). In one implementation, the TTM component may be configured (e.g., as a result of a user sending an order placement input) to automatically generate an order for the security when information leakage that allows superior order execution is detected.

If information leakage for the security has been detected, an order placement allocation for the security may be determined at 671. In one embodiment, the order placement allocation may be determined by a specified trading algorithm based on the detected information leakage. For example, if the counterparty landscape indicates that a sell order has been placed on a certain exchange with a certain inferred limit price, an order placement allocation for a buy order on the exchange at the inferred limit price may be generated.

One or more order placement request datastructures may be sent to one or more exchange servers at 675. In one implementation, order placement requests may be sent in accordance with the determined order placement allocation.

It is to be understood that embodiments of the TTM component described in FIGS. 4 and 6A-B may be combined in a variety of ways. For example, the TTM component may be configured to determine an order placement allocation using the modified internal algorithmic state, and to monitor resulting orders for information leakage.

FIG. 7 shows implementation case(s) for the AIRTPE. FIG. 7 illustrates various questions that may be answered by the AIRTPE. Such questions may include: Who is using what at what urgency? Who is behind the prints? Where are the prints coming from? What algos are in-play?

FIG. 8 shows implementation case(s) for the AIRTPE. In FIG. 8, an example of identifying tier for dark liquidity using the AIRTPE is illustrated.

FIG. 9 shows implementation case(s) for the AIRTPE. In FIG. 9, an example of identifying who is trading using the AIRTPE is illustrated.

FIG. 10 shows implementation case(s) for the AIRTPE. In FIG. 10, an example of identifying algo usage using the AIRTPE is illustrated.

FIG. 11 shows implementation case(s) for the AIRTPE. In FIG. 11, an example of identifying information leakage using the AIRTPE is illustrated.

AIRTPE Controller

FIG. 12 shows a block diagram illustrating embodiments of a AIRTPE controller. In this embodiment, the AIRTPE controller 1201 may serve to aggregate, process, store, search, serve, identify, instruct, generate, match, and/or facilitate interactions with a computer through machine learning technologies, and/or other related data.

Users, which may be people and/or other systems, may engage information technology systems (e.g., computers) to facilitate information processing. In turn, computers employ processors to process information; such processors 1203 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the AIRTPE controller 1201 may be connected to and/or communicate with entities such as, but not limited to: one or more users from peripheral devices 1212 (e.g., user input devices 1211); an optional cryptographic processor device 1228; and/or a communications network 1213.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The AIRTPE controller 1201 may be based on computer systems that may comprise, but are not limited to, components such as: a computer systemization 1202 connected to memory 1229.

Computer Systemization

A computer systemization 1202 may comprise a clock 1230, central processing unit ("CPU(s)") and/or "processor(s)" (these terms are used interchangeable throughout the disclosure unless noted to the contrary)) 1203, a memory 1229 (e.g., a read only memory (ROM) 1206, a random access memory (RAM) 1205, etc.), and/or an interface bus 1207, and most frequently, although not necessarily, are all interconnected and/or communicating through a system bus 1204 on one or more (mother)board(s) 1202 having conductive and/or otherwise transportive circuit pathways through which instructions (e.g., binary encoded signals) may travel to effectuate communications, operations, storage, etc. The computer systemization may be connected to a power source 1286; e.g., optionally the power source may be internal. Optionally, a cryptographic processor 1226 may be connected to the system bus. In another embodiment, the cryptographic processor, transceivers (e.g., ICs) 1274, and/or sensor array (e.g., accelerometer, altimeter, ambient light, barometer, global positioning system (GPS) (thereby allowing AIRTPE controller to determine its location), gyroscope, magnetometer, pedometer, proximity, ultra-violet sensor, etc.) 1273 may be connected as either internal and/or external peripheral devices 1212 via the interface bus I/O 1208 (not pictured) and/or directly via the interface bus 1207. In turn, the transceivers may be connected to antenna(s) 1275, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1229 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's Dragon-Ball® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the AIRTPE controller and beyond through various interfaces. Should processing requirements dictate a greater amount speed and/or capacity, distributed processors (e.g., see Distributed AIRTPE below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the AIRTPE may be achieved by implementing a microcontroller such as CAST's® R8051XC2 microcontroller; Intel's® MCS 51 (i.e., 8051 microcontroller); and/or the like. Also, to implement certain features of the AIRTPE, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the AIRTPE component collection (distributed or otherwise) and/or features may be implemented via the microprocessor and/or via embedded components; e.g., via ASIC, coprocessor, DSP, FPGA, and/or the like. Alternately, some implementations of the AIRTPE may be implemented with embedded components that are configured and used to achieve a variety of features or signal processing.

Depending on the particular implementation, the embedded components may include software solutions, hardware solutions, and/or some combination of both hardware/software solutions. For example, AIRTPE features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the AIRTPE features. A hierarchy of programmable interconnects allow logic blocks to be interconnected as needed by the AIRTPE system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the AIRTPE may be developed on FPGAs and then migrated into a fixed version that more resembles ASIC implementations. Alternate or coordinating implementations may migrate AIRTPE controller features to a final ASIC instead of or in addition to FPGAs. Depending on the implementation all of the aforementioned embedded components and microprocessors may be considered the "CPU" and/or "processor" for the AIRTPE.

Power Source

The power source 1286 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1286 is connected to at least one of the interconnected subsequent components of the AIRTPE thereby providing an electric current to all subsequent components. In one example, the power source 1286 is connected to the system bus component 1204. In an alternative embodiment, an outside power source 1286 is provided through a connection across the I/O 1208 interface. For example, a USB and/or IEEE 1394 connection carries both data and power across the connection and is therefore a suitable source of power.

Interface Adapters

Interface bus(ses) 1207 may accept, connect, and/or communicate to a number of interface adapters, variously although not necessarily in the form of adapter cards, such as but not limited to: input output interfaces (I/O) 1208, storage interfaces 1209, network interfaces 1210, and/or the like. Optionally, cryptographic processor interfaces 1227 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1209 may accept, communicate, and/or connect to a number of storage devices such as, but not limited to: storage devices 1214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1210 may accept, communicate, and/or connect to a communications network 1213. Through a communications network 1213, the AIRTPE controller is accessible through remote clients 1233b (e.g., computers with web browsers) by users 1233a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed AIRTPE below), architectures may similarly be employed to pool, load balance, and/or otherwise decrease/increase the communicative bandwidth required by the AIRTPE controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1210 may be used to engage with various communications network types 1213. For example, multiple network interfaces may be employed to allow for the communication over broadcast, multicast, and/or unicast networks.

Input Output interfaces (I/O) 1208 may accept, communicate, and/or connect to user, peripheral devices 1212 (e.g., input devices 1211), cryptographic processor devices 1228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1212 may be connected and/or communicate to I/O and/or other facilities of the like such as network interfaces, storage interfaces, directly to the interface bus, system bus, the CPU, and/or the like. Peripheral devices may be external, internal and/or part of the AIRTPE controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1211 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the AIRTPE controller may be embodied as an embedded, dedicated, and/or monitor-less (i.e., headless) device, wherein access would be provided over a network interface connection.

Cryptographic units such as, but not limited to, microcontrollers, processors 1226, interfaces 1227, and/or devices 1228 may be attached, and/or communicate with the AIRTPE controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+ MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1229. However, memory is a fungible technology and resource, thus, any number of memory embodiments may be employed in lieu of or in concert with one another. It is to be understood that the AIRTPE controller and/or a computer systemization may employ various forms of memory 1229. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 1229 will include ROM 1206, RAM 1205, and a storage device 1214. A storage device 1214 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1229 may contain a collection of program and/or database components and/or data such as, but not limited to: operating system component(s) 1215 (operating system); information server component(s) 1216 (information server); user interface component(s) 1217 (user interface); Web browser component(s) 1218 (Web browser); database(s) 1219; mail server component(s) 1221; mail client component(s) 1222; cryptographic server component(s) 1220 (cryptographic server); the AIRTPE component(s) 1235; and/or the like (i.e., collectively a component collection). These components may be stored and accessed from the storage devices and/or from storage devices accessible through an interface bus. Although unconventional program components such as those in the component collection may be stored in a local storage device 1214, they may also be loaded and/or stored in memory such as: peripheral devices, RAM, remote storage facilities through a communications network, ROM, various forms of memory, and/or the like.

Operating System

The operating system component 1215 is an executable program component facilitating the operation of the AIRTPE controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the AIRTPE controller to communicate with other entities through a communications network 1213. Various communication protocols may be used by the AIRTPE controller as a subcarrier transport mechanism for interaction, such as, but not limited to: multicast, TCP/IP, UDP, unicast, and/or the like.

Information Server

An information server component 1216 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the AIRTPE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the AIRTPE database 1219, operating systems, other program components, user interfaces, Web browsers, and/or the like.

Access to the AIRTPE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the AIRTPE. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the AIRTPE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 1217 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1218 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the AIRTPE enabled nodes. The combined application may be nugatory on systems employing Web browsers.

Mail Server

A mail server component 1221 is a stored program component that is executed by a CPU 1203. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective–) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the AIRTPE. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the AIRTPE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1222 is a stored program component that is executed by a CPU 1203. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1220 is a stored program component that is executed by a CPU 1203, cryptographic processor 1226, cryptographic processor interface 1227, cryptographic processor device 1228, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD 5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the AIRTPE may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the AIRTPE component to engage in secure transactions if so desired. The cryptographic component facilitates the secure accessing of resources on the AIRTPE and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The AIRTPE Database

The AIRTPE database component 1219 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the AIRTPE database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the AIRTPE database is implemented as a data-structure, the use of the AIRTPE database 1219 may be integrated into another component such as the AIRTPE component 1235. Also, the database may be implemented as a mix of data structures, objects, and relational structures. Databases may be consolidated and/or distributed in countless variations (e.g., see Distributed AIRTPE below). Portions of databases, e.g., tables, may be exported and/or imported and thus decentralized and/or integrated.

In one embodiment, the database component 1219 includes several tables 1219*a-z*:

An accounts table 1219*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accounRestrictions, and/or the like;

A users table 1219*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a AIRTPE);

An devices table 1219c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1219d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1219e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1219f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1219g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1219h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 1219i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisheriD, publisherAddress, publisherURL, publisherTag, publisherIndus try, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A prediction logics table 1219j includes fields such as, but not limited to: predictionLogicID, predictionLogicConfiguration, labeledTradeTickData, trainingSetConfiguration, testingSetConfiguration, ML_TechniqueConfiguration, and/or the like;

A market_data table 1219z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the AIRTPE database may interact with other database systems. For example, employing a distributed database system, queries and data access by search AIRTPE component may treat the combination of the AIRTPE database, an integrated data security layer database as a single database entity (e.g., see Distributed AIRTPE below).

In one embodiment, user programs may contain various user interface primitives, which may serve to update the AIRTPE. Also, various accounts may require custom database tables depending upon the environments and the types of clients the AIRTPE may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 1219*a*-*z*. The AIRTPE may be configured to keep track of various settings, inputs, and parameters via database controllers.

The AIRTPE database may communicate to and/or with other components in a component collection, including itself, and/or facilities of the like. Most frequently, the AIRTPE database communicates with the AIRTPE component, other program components, and/or the like. The database may contain, retain, and provide information regarding other nodes and data.

The AIRTPEs

The AIRTPE component 1235 is a stored program component that is executed by a CPU. In one embodiment, the AIRTPE component incorporates any and/or all combinations of the aspects of the AIRTPE that was discussed in the previous figures. As such, the AIRTPE affects accessing, obtaining and the provision of information, services, transactions, and/or the like across various communications networks. The features and embodiments of the AIRTPE discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the AIRTPE's features and facilities, and in many cases reduce the costs, energy consumption/requirements, and extend the life of AIRTPE's underlying infrastructure; this has the added benefit of making the AIRTPE more reliable. Similarly, many of the features and mechanisms are designed to be easier for users to use and access, thereby broadening the audience that may enjoy/employ and exploit the feature sets of the AIRTPE; such ease of use also helps to increase the reliability of the AIRTPE. In addition, the feature sets include heightened security as noted via the Cryptographic components 1220, 1226, 1228 and throughout, making access to the features and data more reliable and secure The AIRTPE transforms machine learning training input, order placement input inputs, via AIRTPE components (e.g., MLT, TTM), into machine learning training output, order placement output, information leakage alert outputs.

The AIRTPE component enabling access of information between nodes may be developed by employing various development tools and languages such as, but not limited to: Apache® components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the AIRTPE server employs a cryptographic server to encrypt and decrypt communications. The AIRTPE component may communicate to and/or with other components in a component collection, including itself, and/or facilities of the like. Most frequently, the AIRTPE component communicates with the AIRTPE database, operating systems, other program components, and/or the like. The AIRTPE may contain, communicate, generate, obtain, and/or provide program component, system, user, and/or data communications, requests, and/or responses.

Distributed AIRTPEs

The structure and/or operation of any of the AIRTPE node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the AIRTPE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for AIRTPE controller and/or AIRTPE component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RAE), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the AIRTPE controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = ""
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/
 index.jsp?topic=/com.ibm.IBMDI.doc/
 referenceguide295.htm and other parser implementations:

http://publib.boulder.ibm.com/infocenter/tivihelp/v2r1/
 index.jsp?topic=/com.ibm.IBMDI.doc/
 referenceguide259.htm all of which are hereby expressly incorporated by reference.

Additional embodiments may include:

1. An artificial intelligence-based information leakage alert generating apparatus, comprising:
 a memory;
 a component collection in the memory, including:
  a trade tick monitoring component;
 a processor disposed in communication with the memory, and configured to issue a plurality of processing instructions from the component collection stored in the memory,
  wherein the processor issues instructions from the trade tick monitoring component, stored in the memory, to:
   obtain, via at least one processor, an order placement datastructure, wherein the order placement datastructure includes a security identifier and a trading algorithm identifier;
   determine, via at least one processor, an order placement allocation for the security identifier based on a trading algorithm associated with the trading algorithm identifier;
   send, via at least one processor, an order placement request datastructure for a first order specified by the order placement allocation to a server associated with a first venue specified by the order placement allocation for the first order;
   obtain, via at least one processor, a set of trade tick data messages associated with the first venue, wherein the set of trade tick data messages pertains to the security identifier;

determine, via at least one processor, a set of inferred labels for each obtained trade tick data message using a real-time prediction logic generated using a machine learning technique;
select, via at least one processor, an inferred label type;
group, via at least one processor, the determined inferred labels of the selected inferred label type for the set of trade tick data messages into specified buckets;
determine, via at least one processor, that the grouped inferred labels correspond to execution data generated by the first order; and
generate, via at least one processor, an information leakage alert for the selected inferred label type.

2. The apparatus of embodiment 1, wherein the order placement allocation specifies a plurality of orders to place in a plurality of venues.

3. The apparatus of embodiment 1, wherein the inferred label type is one of: predicted trading algorithm type, predicted client type, predicted tier, predicted state, predicted venue, predicted limit price.

4. The apparatus of embodiment 1, wherein the specified buckets are time buckets having a specified size.

5. The apparatus of embodiment 4, wherein the information leakage alert is an allocation information leakage alert generated based on determining that the predicted trading algorithm type corresponds to the trading algorithm type associated with the trading algorithm identifier.

6. The apparatus of embodiment 5, further, comprising:
the processor issues instructions from the trade tick monitoring component, stored in the memory, to:
modify, via at least one processor, the order placement allocation for the security identifier using a different trading algorithm; and
send, via at least one processor, an order placement request datastructure for a second order specified by the modified order placement allocation.

7. The apparatus of embodiment 1, wherein the order placement datastructure further includes a limit price, and wherein the specified buckets are price buckets.

8. The apparatus of embodiment 7, wherein the information leakage alert is a limit price information leakage alert generated based on determining that the predicted limit price is within a threshold of the limit price.

9. The apparatus of embodiment 8, further, comprising:
the processor issues instructions from the trade tick monitoring component, stored in the memory, to:
modify, via at least one processor, the order placement allocation for the security identifier to use a different limit price; and
send, via at least one processor, an order placement request datastructure for a second order having the different limit price.

10. The apparatus of embodiment 1, further, comprising:
the processor issues instructions from the trade tick monitoring component, stored in the memory, to:
compute, via at least one processor, a real-time liquidity model for the security identifier using the determined inferred labels;
assess, via at least one processor, counterparty landscape for the first order using the real-time liquidity model; and
modify, via at least one processor, an internal state of the trading algorithm associated with the trading algorithm identifier based on the counterparty landscape.

11. The apparatus of embodiment 10, wherein the order placement allocation for the security identifier is further determined based on the modified internal state of the trading algorithm.

12. The apparatus of embodiment 10, further, comprising:
the processor issues instructions from the trade tick monitoring component, stored in the memory, to:
modify, via at least one processor, the order placement allocation for the security identifier based on the modified internal state of the trading algorithm; and
send, via at least one processor, an order placement request datastructure for a second order specified by the modified order placement allocation.

13. The apparatus of embodiment 10, wherein the real-time liquidity model for the security identifier indicates at least one of: percentages of orders that are executed in different markets, percentages of orders that are executed using different trading algorithms.

14. The apparatus of embodiment 1, wherein the machine learning technique used to generate the real-time prediction logic is one of: random forest, gradient boosting, decision tree, logistic regression.

15. The apparatus of embodiment 14, further, comprising:
a machine learning training component;
wherein the processor issues instructions from the machine learning training component, stored in the memory, to:
retrieve, via at least one processor, historical trade tick data;
retrieve, via at least one processor, historical quote data;
augment, via at least one processor, the historical trade tick data with the historical quote data, wherein an as of join of the historical quote data and the historical trade tick data is performed;
retrieve, via at least one processor, historical order execution data;
determine, via at least one processor, venues for the historical order execution data;
determine, via at least one processor, time buffers for the historical order execution data, wherein each venue is associated with a separate time buffer;
generate, via at least one processor, labeled trade tick data, wherein an as of join of the historical order execution data and the augmented historical trade tick data is performed;
select, via at least one processor, a subset of the labeled trade tick data that avoids overfitting using sampling stratified over a set of buckets; and
train, via at least one processor, the real-time prediction logic using the machine learning technique and the selected subset of the labeled trade tick data.

16. A processor-readable artificial intelligence-based information leakage alert generating non-transient physical medium storing processor-executable components, the components, comprising:
a component collection stored in the medium, including:
a trade tick monitoring component;
wherein the trade tick monitoring component, stored in the medium, includes processor-issuable instructions to:
obtain, via at least one processor, an order placement datastructure, wherein the order placement datastructure includes a security identifier and a trading algorithm identifier;
determine, via at least one processor, an order placement allocation for the security identifier based on a trading algorithm associated with the trading algorithm identifier;

send, via at least one processor, an order placement request datastructure for a first order specified by the order placement allocation to a server associated with a first venue specified by the order placement allocation for the first order;

obtain, via at least one processor, a set of trade tick data messages associated with the first venue, wherein the set of trade tick data messages pertains to the security identifier;

determine, via at least one processor, a set of inferred labels for each obtained trade tick data message using a real-time prediction logic generated using a machine learning technique;

select, via at least one processor, an inferred label type;

group, via at least one processor, the determined inferred labels of the selected inferred label type for the set of trade tick data messages into specified buckets;

determine, via at least one processor, that the grouped inferred labels correspond to execution data generated by the first order; and generate, via at least one processor, an information leakage alert for the selected inferred label type.

17. The medium of embodiment 16, wherein the order placement allocation specifies a plurality of orders to place in a plurality of venues.

18. The medium of embodiment 16, wherein the inferred label type is one of: predicted trading algorithm type, predicted client type, predicted tier, predicted state, predicted venue, predicted limit price.

19. The medium of embodiment 16, wherein the specified buckets are time buckets having a specified size.

20. The medium of embodiment 19, wherein the information leakage alert is an allocation information leakage alert generated based on determining that the predicted trading algorithm type corresponds to the trading algorithm type associated with the trading algorithm identifier.

21. The medium of embodiment 20, further, comprising:
the trade tick monitoring component, stored in the medium, includes processor-issuable instructions to:
modify, via at least one processor, the order placement allocation for the security identifier using a different trading algorithm; and
send, via at least one processor, an order placement request datastructure for a second order specified by the modified order placement allocation.

22. The medium of embodiment 16, wherein the order placement datastructure further includes a limit price, and wherein the specified buckets are price buckets.

23. The medium of embodiment 22, wherein the information leakage alert is a limit price information leakage alert generated based on determining that the predicted limit price is within a threshold of the limit price.

24. The medium of embodiment 23, further, comprising:
the trade tick monitoring component, stored in the medium, includes processor-issuable instructions to:
modify, via at least one processor, the order placement allocation for the security identifier to use a different limit price; and
send, via at least one processor, an order placement request datastructure for a second order having the different limit price.

25. The medium of embodiment 16, further, comprising:
the trade tick monitoring component, stored in the medium, includes processor-issuable instructions to:
compute, via at least one processor, a real-time liquidity model for the security identifier using the determined inferred labels;

assess, via at least one processor, counterparty landscape for the first order using the real-time liquidity model; and
modify, via at least one processor, an internal state of the trading algorithm associated with the trading algorithm identifier based on the counterparty landscape.

26. The medium of embodiment 25, wherein the order placement allocation for the security identifier is further determined based on the modified internal state of the trading algorithm.

27. The medium of embodiment 25, further, comprising:
the trade tick monitoring component, stored in the medium, includes processor-issuable instructions to:
modify, via at least one processor, the order placement allocation for the security identifier based on the modified internal state of the trading algorithm; and
send, via at least one processor, an order placement request datastructure for a second order specified by the modified order placement allocation.

28. The medium of embodiment 25, wherein the real-time liquidity model for the security identifier indicates at least one of: percentages of orders that are executed in different markets, percentages of orders that are executed using different trading algorithms.

29. The medium of embodiment 16, wherein the machine learning technique used to generate the real-time prediction logic is one of: random forest, gradient boosting, decision tree, logistic regression.

30. The medium of embodiment 29, further, comprising:
a machine learning training component;
wherein the machine learning training component, stored in the medium, includes processor-issuable instructions to:
retrieve, via at least one processor, historical trade tick data;
retrieve, via at least one processor, historical quote data;
augment, via at least one processor, the historical trade tick data with the historical quote data, wherein an as of join of the historical quote data and the historical trade tick data is performed;
retrieve, via at least one processor, historical order execution data;
determine, via at least one processor, venues for the historical order execution data;
determine, via at least one processor, time buffers for the historical order execution data, wherein each venue is associated with a separate time buffer;
generate, via at least one processor, labeled trade tick data, wherein an as of join of the historical order execution data and the augmented historical trade tick data is performed;
select, via at least one processor, a subset of the labeled trade tick data that avoids overfitting using sampling stratified over a set of buckets; and
train, via at least one processor, the real-time prediction logic using the machine learning technique and the selected subset of the labeled trade tick data.

31. A processor-implemented artificial intelligence-based information leakage alert generating system, comprising:
a trade tick monitoring component means, to:
obtain, via at least one processor, an order placement datastructure, wherein the order placement datastructure includes a security identifier and a trading algorithm identifier;
determine, via at least one processor, an order placement allocation for the security identifier based on a trading algorithm associated with the trading algorithm identifier;

send, via at least one processor, an order placement request datastructure for a first order specified by the order placement allocation to a server associated with a first venue specified by the order placement allocation for the first order;

obtain, via at least one processor, a set of trade tick data messages associated with the first venue, wherein the set of trade tick data messages pertains to the security identifier;

determine, via at least one processor, a set of inferred labels for each obtained trade tick data message using a real-time prediction logic generated using a machine learning technique;

select, via at least one processor, an inferred label type;

group, via at least one processor, the determined inferred labels of the selected inferred label type for the set of trade tick data messages into specified buckets;

determine, via at least one processor, that the grouped inferred labels correspond to execution data generated by the first order; and generate, via at least one processor, an information leakage alert for the selected inferred label type.

32. The system of embodiment 31, wherein the order placement allocation specifies a plurality of orders to place in a plurality of venues.

33. The system of embodiment 31, wherein the inferred label type is one of: predicted trading algorithm type, predicted client type, predicted tier, predicted state, predicted venue, predicted limit price.

34. The system of embodiment 31, wherein the specified buckets are time buckets having a specified size.

35. The system of embodiment 34, wherein the information leakage alert is an allocation information leakage alert generated based on determining that the predicted trading algorithm type corresponds to the trading algorithm type associated with the trading algorithm identifier.

36. The system of embodiment 35, further, comprising:
the trade tick monitoring component means, to:
modify, via at least one processor, the order placement allocation for the security identifier using a different trading algorithm; and
send, via at least one processor, an order placement request datastructure for a second order specified by the modified order placement allocation.

37. The system of embodiment 31, wherein the order placement datastructure further includes a limit price, and wherein the specified buckets are price buckets.

38. The system of embodiment 37, wherein the information leakage alert is a limit price information leakage alert generated based on determining that the predicted limit price is within a threshold of the limit price.

39. The system of embodiment 38, further, comprising:
the trade tick monitoring component means, to:
modify, via at least one processor, the order placement allocation for the security identifier to use a different limit price; and
send, via at least one processor, an order placement request datastructure for a second order having the different limit price.

40. The system of embodiment 31, further, comprising:
the trade tick monitoring component means, to:
compute, via at least one processor, a real-time liquidity model for the security identifier using the determined inferred labels;
assess, via at least one processor, counterparty landscape for the first order using the real-time liquidity model; and
modify, via at least one processor, an internal state of the trading algorithm associated with the trading algorithm identifier based on the counterparty landscape.

41. The system of embodiment 40, wherein the order placement allocation for the security identifier is further determined based on the modified internal state of the trading algorithm.

42. The system of embodiment 40, further, comprising:
the trade tick monitoring component means, to:
modify, via at least one processor, the order placement allocation for the security identifier based on the modified internal state of the trading algorithm; and
send, via at least one processor, an order placement request datastructure for a second order specified by the modified order placement allocation.

43. The system of embodiment 40, wherein the real-time liquidity model for the security identifier indicates at least one of: percentages of orders that are executed in different markets, percentages of orders that are executed using different trading algorithms.

44. The system of embodiment 31, wherein the machine learning technique used to generate the real-time prediction logic is one of: random forest, gradient boosting, decision tree, logistic regression.

45. The system of embodiment 44, further, comprising:
a machine learning training component means, to:
retrieve, via at least one processor, historical trade tick data;
retrieve, via at least one processor, historical quote data;
augment, via at least one processor, the historical trade tick data with the historical quote data, wherein an as of join of the historical quote data and the historical trade tick data is performed;
retrieve, via at least one processor, historical order execution data;
determine, via at least one processor, venues for the historical order execution data;
determine, via at least one processor, time buffers for the historical order execution data, wherein each venue is associated with a separate time buffer;
generate, via at least one processor, labeled trade tick data, wherein an as of join of the historical order execution data and the augmented historical trade tick data is performed;
select, via at least one processor, a subset of the labeled trade tick data that avoids overfitting using sampling stratified over a set of buckets; and
train, via at least one processor, the real-time prediction logic using the machine learning technique and the selected subset of the labeled trade tick data.

46. A processor-implemented artificial intelligence-based information leakage alert generating method, comprising:
executing processor-implemented trade tick monitoring component instructions to:
obtain, via at least one processor, an order placement datastructure, wherein the order placement datastructure includes a security identifier and a trading algorithm identifier;
determine, via at least one processor, an order placement allocation for the security identifier based on a trading algorithm associated with the trading algorithm identifier;
send, via at least one processor, an order placement request datastructure for a first order specified by the order placement allocation to a server associated with a first venue specified by the order placement allocation for the first order;

obtain, via at least one processor, a set of trade tick data messages associated with the first venue, wherein the set of trade tick data messages pertains to the security identifier;

determine, via at least one processor, a set of inferred labels for each obtained trade tick data message using a real-time prediction logic generated using a machine learning technique;

select, via at least one processor, an inferred label type;

group, via at least one processor, the determined inferred labels of the selected inferred label type for the set of trade tick data messages into specified buckets;

determine, via at least one processor, that the grouped inferred labels correspond to execution data generated by the first order; and generate, via at least one processor, an information leakage alert for the selected inferred label type.

47. The method of embodiment 46, wherein the order placement allocation specifies a plurality of orders to place in a plurality of venues.

48. The method of embodiment 46, wherein the inferred label type is one of: predicted trading algorithm type, predicted client type, predicted tier, predicted state, predicted venue, predicted limit price.

49. The method of embodiment 46, wherein the specified buckets are time buckets having a specified size.

50. The method of embodiment 49, wherein the information leakage alert is an allocation information leakage alert generated based on determining that the predicted trading algorithm type corresponds to the trading algorithm type associated with the trading algorithm identifier.

51. The method of embodiment 50, further, comprising:
executing processor-implemented trade tick monitoring component instructions to:
   modify, via at least one processor, the order placement allocation for the security identifier using a different trading algorithm; and
   send, via at least one processor, an order placement request datastructure for a second order specified by the modified order placement allocation.

52. The method of embodiment 46, wherein the order placement datastructure further includes a limit price, and wherein the specified buckets are price buckets.

53. The method of embodiment 52, wherein the information leakage alert is a limit price information leakage alert generated based on determining that the predicted limit price is within a threshold of the limit price.

54. The method of embodiment 53, further, comprising:
executing processor-implemented trade tick monitoring component instructions to:
   modify, via at least one processor, the order placement allocation for the security identifier to use a different limit price; and
   send, via at least one processor, an order placement request datastructure for a second order having the different limit price.

55. The method of embodiment 46, further, comprising:
executing processor-implemented trade tick monitoring component instructions to:
   compute, via at least one processor, a real-time liquidity model for the security identifier using the determined inferred labels;
   assess, via at least one processor, counterparty landscape for the first order using the real-time liquidity model; and
   modify, via at least one processor, an internal state of the trading algorithm associated with the trading algorithm identifier based on the counterparty landscape.

56. The method of embodiment 55, wherein the order placement allocation for the security identifier is further determined based on the modified internal state of the trading algorithm.

57. The method of embodiment 55, further, comprising:
executing processor-implemented trade tick monitoring component instructions to:
   modify, via at least one processor, the order placement allocation for the security identifier based on the modified internal state of the trading algorithm; and
   send, via at least one processor, an order placement request datastructure for a second order specified by the modified order placement allocation.

58. The method of embodiment 55, wherein the real-time liquidity model for the security identifier indicates at least one of: percentages of orders that are executed in different markets, percentages of orders that are executed using different trading algorithms.

59. The method of embodiment 46, wherein the machine learning technique used to generate the real-time prediction logic is one of: random forest, gradient boosting, decision tree, logistic regression.

60. The method of embodiment 59, further, comprising:
executing processor-implemented machine learning training component instructions to:
   retrieve, via at least one processor, historical trade tick data;
   retrieve, via at least one processor, historical quote data;
   augment, via at least one processor, the historical trade tick data with the historical quote data, wherein an as of join of the historical quote data and the historical trade tick data is performed;
   retrieve, via at least one processor, historical order execution data;
   determine, via at least one processor, venues for the historical order execution data;
   determine, via at least one processor, time buffers for the historical order execution data, wherein each venue is associated with a separate time buffer;
   generate, via at least one processor, labeled trade tick data, wherein an as of join of the historical order execution data and the augmented historical trade tick data is performed;
   select, via at least one processor, a subset of the labeled trade tick data that avoids overfitting using sampling stratified over a set of buckets; and
   train, via at least one processor, the real-time prediction logic using the machine learning technique and the selected subset of the labeled trade tick data.

119. An artificial intelligence-based information leakage order generating apparatus, comprising:
a memory;
a component collection in the memory, including:
   a trade tick monitoring component;
a processor disposed in communication with the memory, and configured to issue a plurality of processing instructions from the component collection stored in the memory,
wherein the processor issues instructions from the trade tick monitoring component, stored in the memory, to:
   obtain, via at least one processor, a set of trade tick data messages, wherein the set of trade tick data messages pertains to a security identifier;

determine, via at least one processor, a set of inferred labels for each obtained trade tick data message using a real-time prediction logic generated using a machine learning technique;
compute, via at least one processor, a real-time liquidity model for the security identifier using the determined inferred labels;
assess, via at least one processor, counterparty landscape for the security identifier using the real-time liquidity model;
detect, via at least one processor, information leakage associated with the security identifier based on the assessment of the counterparty landscape;
determine, via at least one processor, an order placement allocation for the security identifier based on the detected information leakage; and
send, via at least one processor, an order placement request datastructure for a first order specified by the order placement allocation to a server associated with a first venue specified by the order placement allocation for the first order.

120. A processor-readable artificial intelligence-based information leakage order generating non-transient physical medium storing processor-executable components, the components, comprising:
a component collection stored in the medium, including:
a trade tick monitoring component;
wherein the trade tick monitoring component, stored in the medium, includes processor-issuable instructions to:
obtain, via at least one processor, a set of trade tick data messages, wherein the set of trade tick data messages pertains to a security identifier;
determine, via at least one processor, a set of inferred labels for each obtained trade tick data message using a real-time prediction logic generated using a machine learning technique;
compute, via at least one processor, a real-time liquidity model for the security identifier using the determined inferred labels;
assess, via at least one processor, counterparty landscape for the security identifier using the real-time liquidity model;
detect, via at least one processor, information leakage associated with the security identifier based on the assessment of the counterparty landscape;
determine, via at least one processor, an order placement allocation for the security identifier based on the detected information leakage; and
send, via at least one processor, an order placement request datastructure for a first order specified by the order placement allocation to a server associated with a first venue specified by the order placement allocation for the first order.

121. A processor-implemented artificial intelligence-based information leakage order generating system, comprising:
a trade tick monitoring component means, to:
obtain, via at least one processor, a set of trade tick data messages, wherein the set of trade tick data messages pertains to a security identifier;
determine, via at least one processor, a set of inferred labels for each obtained trade tick data message using a real-time prediction logic generated using a machine learning technique;
compute, via at least one processor, a real-time liquidity model for the security identifier using the determined inferred labels;
assess, via at least one processor, counterparty landscape for the security identifier using the real-time liquidity model;
detect, via at least one processor, information leakage associated with the security identifier based on the assessment of the counterparty landscape;
determine, via at least one processor, an order placement allocation for the security identifier based on the detected information leakage; and
send, via at least one processor, an order placement request datastructure for a first order specified by the order placement allocation to a server associated with a first venue specified by the order placement allocation for the first order.

122. A processor-implemented artificial intelligence-based information leakage order generating method, comprising:
executing processor-implemented trade tick monitoring component instructions to:
obtain, via at least one processor, a set of trade tick data messages, wherein the set of trade tick data messages pertains to a security identifier;
determine, via at least one processor, a set of inferred labels for each obtained trade tick data message using a real-time prediction logic generated using a machine learning technique;
compute, via at least one processor, a real-time liquidity model for the security identifier using the determined inferred labels;
assess, via at least one processor, counterparty landscape for the security identifier using the real-time liquidity model;
detect, via at least one processor, information leakage associated with the security identifier based on the assessment of the counterparty landscape;
determine, via at least one processor, an order placement allocation for the security identifier based on the detected information leakage; and
send, via at least one processor, an order placement request datastructure for a first order specified by the order placement allocation to a server associated with a first venue specified by the order placement allocation for the first order.

In order to address various issues and advance the art, the entirety of this application for AI-Based Real-Time Prediction Engine Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a AIRTPE individual and/or enterprise user, database configuration and/or relational model, data type, data transmission and/or network framework, syntax structure, and/or the like, various embodiments of the AIRTPE, may be implemented that allow a great deal of flexibility and customization. For example, aspects of the AIRTPE may be adapted for derivatives. While various embodiments and discussions of the AIRTPE have included machine learning, however, it is to be understood that the embodiments described herein may be readily configured and/or customized for a wide variety of other applications and/or implementations.

What is claimed is:

1. An artificial intelligence-based information leakage alert generating apparatus, comprising:
   a memory;
   a component collection in the memory, including:
     a trade tick monitoring component;
   a processor disposed in communication with the memory, and configured to issue a plurality of processing instructions from the component collection stored in the memory,
     wherein the processor issues instructions from the trade tick monitoring component, stored in the memory, to:
       obtain, via at least one processor, an order placement datastructure, wherein the order placement datastructure includes a security identifier and a trading algorithm identifier;
       determine, via at least one processor, an order placement allocation for the security identifier based on a trading algorithm associated with the trading algorithm identifier;
       send, via at least one processor, an order placement request datastructure for a first order specified by the order placement allocation to a server associated with a first venue specified by the order placement allocation for the first order wherein the order placement request datastructure includes a limit price;
       obtain, via at least one processor, a set of trade tick data messages associated with the first venue, wherein the set of trade tick data messages pertains to the security identifier;
       determine, via at least one processor, a set of inferred labels for each obtained trade tick data message using a real-time prediction logic generated using a machine learning technique;
       select, via at least one processor, an inferred label type;
       group, via at least one processor, the determined inferred labels of the selected inferred label type for the set of trade tick data messages into specified buckets, wherein the specified buckets are price buckets;
       determine, via at least one processor, that the grouped inferred labels correspond to execution data generated by the first order; and
       generate, via at least one processor, an information leakage alert for the selected inferred label type, wherein the information leakage alert is a limit price information leakage alert generated based on determining that the predicted limit price is within a threshold of the limit price.

2. The apparatus of claim 1, wherein the order placement allocation specifies a plurality of orders to place in a plurality of venues.

3. The apparatus of claim 1, wherein the inferred label type is one of: predicted trading algorithm type, predicted client type, predicted tier, predicted state, predicted venue, predicted limit price.

4. The apparatus of claim 1, wherein the specified buckets are time buckets having a specified size.

5. The apparatus of claim 4, wherein the information leakage alert is an allocation information leakage alert generated based on determining that the predicted trading algorithm type corresponds to the trading algorithm type associated with the trading algorithm identifier.

6. The apparatus of claim 5, further, comprising:
the processor issues instructions from the trade tick monitoring component, stored in the memory, to:
modify, via at least one processor, the order placement allocation for the security identifier using a different trading algorithm; and
send, via at least one processor, an order placement request datastructure for a second order specified by the modified order placement allocation.

7. The apparatus of claim 1, wherein the order placement datastructure further includes a limit price, and wherein the specified buckets are price buckets.

8. The apparatus of claim 7, wherein the information leakage alert is a limit price information leakage alert generated based on determining that the predicted limit price is within a threshold of the limit price.

9. The apparatus of claim 8, further, comprising:
the processor issues instructions from the trade tick monitoring component, stored in the memory, to:
modify, via at least one processor, the order placement allocation for the security identifier to use a different limit price; and
send, via at least one processor, an order placement request datastructure for a second order having the different limit price.

10. The apparatus of claim 1, further, comprising:
the processor issues instructions from the trade tick monitoring component, stored in the memory, to:
compute, via at least one processor, a real-time liquidity model for the security identifier using the determined inferred labels;
assess, via at least one processor, counterparty landscape for the first order using the real-time liquidity model; and
modify, via at least one processor, an internal state of the trading algorithm associated with the trading algorithm identifier based on the counterparty landscape.

11. The apparatus of claim 10, wherein the order placement allocation for the security identifier is further determined based on the modified internal state of the trading algorithm.

12. The apparatus of claim 10, further, comprising:
the processor issues instructions from the trade tick monitoring component, stored in the memory, to:
modify, via at least one processor, the order placement allocation for the security identifier based on the modified internal state of the trading algorithm; and
send, via at least one processor, an order placement request datastructure for a second order specified by the modified order placement allocation.

13. The apparatus of claim 10, wherein the real-time liquidity model for the security identifier indicates at least one of: percentages of orders that are executed in different markets, percentages of orders that are executed using different trading algorithms.

14. The apparatus of claim 1, wherein the machine learning technique used to generate the real-time prediction logic is one of: random forest, gradient boosting, decision tree, logistic regression.

15. The apparatus of claim 14, further, comprising:
a machine learning training component;
wherein the processor issues instructions from the machine learning training component, stored in the memory, to:

retrieve, via at least one processor, historical trade tick data;
retrieve, via at least one processor, historical quote data;
augment, via at least one processor, the historical trade tick data with the historical quote data, wherein an as of join of the historical quote data and the historical trade tick data is performed;
retrieve, via at least one processor, historical order execution data;
determine, via at least one processor, venues for the historical order execution data;
determine, via at least one processor, time buffers for the historical order execution data, wherein each venue is associated with a separate time buffer;
generate, via at least one processor, labeled trade tick data, wherein an as of join of the historical order execution data and the augmented historical trade tick data is performed;
select, via at least one processor, a subset of the labeled trade tick data that avoids overfitting using sampling stratified over a set of buckets; and
train, via at least one processor, the real-time prediction logic using the machine learning technique and the selected subset of the labeled trade tick data.

16. A processor-readable artificial intelligence-based information leakage alert generating non-transient physical medium storing processor-executable components, the components, comprising:
a component collection stored in the medium, including:
a trade tick monitoring component;
wherein the trade tick monitoring component, stored in the medium, includes processor-issuable instructions to:
obtain, via at least one processor, an order placement datastructure, wherein the order placement datastructure includes a security identifier and a trading algorithm identifier;
determine, via at least one processor, an order placement allocation for the security identifier based on a trading algorithm associated with the trading algorithm identifier;
send, via at least one processor, an order placement request datastructure for a first order specified by the order placement allocation to a server associated with a first venue specified by the order placement allocation for the first order, wherein the order placement request datastructure includes a limit price;
obtain, via at least one processor, a set of trade tick data messages associated with the first venue, wherein the set of trade tick data messages pertains to the security identifier;
determine, via at least one processor, a set of inferred labels for each obtained trade tick data message using a real-time prediction logic generated using a machine learning technique;
select, via at least one processor, an inferred label type;
group, via at least one processor, the determined inferred labels of the selected inferred label type for the set of trade tick data messages into specified buckets, wherein the specified buckets are price buckets;
determine, via at least one processor, that the grouped inferred labels correspond to execution data generated by the first order; and generate, via at least one processor, an information leakage alert for the selected inferred label type, wherein the information leakage alert is a limit price information leakage alert generated based on determining that the predicted limit price is within a threshold of the limit price.

17. A processor-implemented artificial intelligence-based information leakage alert generating system, comprising:
a trade tick monitoring component means, to:
obtain, via at least one processor, an order placement datastructure, wherein the order placement datastructure includes a security identifier and a trading algorithm identifier;
determine, via at least one processor, an order placement allocation for the security identifier based on a trading algorithm associated with the trading algorithm identifier;
send, via at least one processor, an order placement request datastructure for a first order specified by the order placement allocation to a server associated with a first venue specified by the order placement allocation for the first order, wherein the order placement request datastructure includes a limit price;
obtain, via at least one processor, a set of trade tick data messages associated with the first venue, wherein the set of trade tick data messages pertains to the security identifier;
determine, via at least one processor, a set of inferred labels for each obtained trade tick data message using a real-time prediction logic generated using a machine learning technique;
select, via at least one processor, an inferred label type;
group, via at least one processor, the determined inferred labels of the selected inferred label type for the set of trade tick data messages into specified buckets, wherein the specified buckets are price buckets;
determine, via at least one processor, that the grouped inferred labels correspond to execution data generated by the first order; and
generate, via at least one processor, an information leakage alert for the selected inferred label type, wherein the information leakage alert is a limit price information leakage alert generated based on determining that the predicted limit price is within a threshold of the limit price.

18. A processor-implemented artificial intelligence-based information leakage alert generating method, comprising:
executing processor-implemented trade tick monitoring component instructions to:
obtain, via at least one processor, an order placement datastructure, wherein the order placement datastructure includes a security identifier and a trading algorithm identifier;
determine, via at least one processor, an order placement allocation for the security identifier based on a trading algorithm associated with the trading algorithm identifier;
send, via at least one processor, an order placement request datastructure for a first order specified by the order placement allocation to a server associated with a first venue specified by the order placement allocation for the first order, wherein the order placement request datastructure includes a limit price;
obtain, via at least one processor, a set of trade tick data messages associated with the first venue, wherein the set of trade tick data messages pertains to the security identifier;
determine, via at least one processor, a set of inferred labels for each obtained trade tick data message using a real-time prediction logic generated using a machine learning technique;
select, via at least one processor, an inferred label type;
group, via at least one processor, the determined inferred labels of the selected inferred label type for the set of trade tick data messages into specified buckets, wherein the specified buckets are price buckets;
determine, via at least one processor, that the grouped inferred labels correspond to execution data generated by the first order; and
generate, via at least one processor, an information leakage alert for the selected inferred label type, wherein the information leakage alert is a limit price information leakage alert generated based on determining that the predicted limit price is within a threshold of the limit price.

19. An artificial intelligence-based information leakage order generating apparatus, comprising:
a memory;
a component collection in the memory, including:
a trade tick monitoring component;
a processor disposed in communication with the memory, and configured to issue a plurality of processing instructions from the component collection stored in the memory,
wherein the processor issues instructions from the trade tick monitoring component, stored in the memory, to:
obtain, via at least one processor, a set of trade tick data messages, wherein the set of trade tick data messages pertains to a security identifier;
determine, via at least one processor, a set of inferred labels for each obtained trade tick data message using a real-time prediction logic generated using a machine learning technique, and group the set of inferred labels into price buckets;
compute, via at least one processor, a real-time liquidity model for the security identifier using the determined inferred labels;
assess, via at least one processor, counterparty landscape for the security identifier using the real-time liquidity model;
detect, via at least one processor, information leakage associated with the security identifier based on the assessment of the counterparty landscape, wherein the information leakage alert is a limit price information leakage alert generated based on determining that a predicted limit price is within a threshold of the limit price;
determine, via at least one processor, an order placement allocation for the security identifier based on the detected information leakage; and
send, via at least one processor, an order placement request datastructure for a first order specified by the order placement allocation to a server associated with a first venue specified by the order placement allocation for the first order, wherein the order placement request datastructure includes a limit price.

20. A processor-readable artificial intelligence-based information leakage order generating non-transient physical medium storing processor-executable components, the components, comprising:
a component collection stored in the medium, including:
a trade tick monitoring component;
wherein the trade tick monitoring component, stored in the medium, includes processor-issuable instructions to:
obtain, via at least one processor, a set of trade tick data messages, wherein the set of trade tick data messages pertains to a security identifier;
determine, via at least one processor, a set of inferred labels for each obtained trade tick data message using a real-time prediction logic generated using a machine learning technique, and group the set of inferred labels into price buckets;
compute, via at least one processor, a real-time liquidity model for the security identifier using the determined inferred labels;
assess, via at least one processor, counterparty landscape for the security identifier using the real-time liquidity model;
detect, via at least one processor, information leakage associated with the security identifier based on the assessment of the counterparty landscape, wherein the information leakage alert is a limit price information leakage alert generated based on determining that a predicted limit price is within a threshold of the limit price;
determine, via at least one processor, an order placement allocation for the security identifier based on the detected information leakage; and
send, via at least one processor, an order placement request datastructure for a first order specified by the order placement allocation to a server associated with a first venue specified by the order placement allocation for the first order, wherein the order placement request datastructure includes a limit price.

21. A processor-implemented artificial intelligence-based information leakage order generating system, comprising:
a trade tick monitoring component means, to:
obtain, via at least one processor, a set of trade tick data messages, wherein the set of trade tick data messages pertains to a security identifier;
determine, via at least one processor, a set of inferred labels for each obtained trade tick data message using a real-time prediction logic generated using a machine learning technique, and group the set of inferred labels into price buckets;
compute, via at least one processor, a real-time liquidity model for the security identifier using the determined inferred labels;
assess, via at least one processor, counterparty landscape for the security identifier using the real-time liquidity model;
detect, via at least one processor, information leakage associated with the security identifier based on the assessment of the counterparty landscape, wherein the information leakage alert is a limit price information leakage alert generated based on determining that a predicted limit price is within a threshold of the limit price;
determine, via at least one processor, an order placement allocation for the security identifier based on the detected information leakage; and
send, via at least one processor, an order placement request datastructure for a first order specified by the order placement allocation to a server associated with a first venue specified by the order placement allocation for the first order, wherein the order placement request datastructure includes a limit price.

22. A processor-implemented artificial intelligence-based information leakage order generating method, comprising:
executing processor-implemented trade tick monitoring component instructions to:
obtain, via at least one processor, a set of trade tick data messages, wherein the set of trade tick data messages pertains to a security identifier;
determine, via at least one processor, a set of inferred labels for each obtained trade tick data message using a real-time prediction logic generated using a machine learning technique, and group the set of inferred labels into price buckets;
compute, via at least one processor, a real-time liquidity model for the security identifier using the determined inferred labels;
assess, via at least one processor, counterparty landscape for the security identifier using the real-time liquidity model;
detect, via at least one processor, information leakage associated with the security identifier based on the assessment of the counterparty landscape, wherein the information leakage alert is a limit price information leakage alert generated based on determining that a predicted limit price is within a threshold of the limit price;
determine, via at least one processor, an order placement allocation for the security identifier based on the detected information leakage; and
send, via at least one processor, an order placement request datastructure for a first order specified by the order placement allocation to a server associated with a first venue specified by the order placement allocation for the first order, wherein the order placement request datastructure includes a limit price.

* * * * *